(12) United States Patent
Nishida et al.

(10) Patent No.: US 7,219,356 B2
(45) Date of Patent: May 15, 2007

(54) OPTICAL DISC DRIVING APPARATUS

(75) Inventors: Hiroto Nishida, Kahoku-gun (JP);
Akira Matsumoto, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/382,810

(22) Filed: May 11, 2006

(65) Prior Publication Data
US 2006/0193240 A1   Aug. 31, 2006

Related U.S. Application Data

(62) Division of application No. 10/629,396, filed on Jul. 29, 2003, now Pat. No. 7,100,176.

(30) Foreign Application Priority Data

Jul. 30, 2002   (JP)   ............................. 2002/221283

(51) Int. Cl.
   *G11B 17/03*   (2006.01)
(52) U.S. Cl. ...................................... 720/635; 720/600
(58) Field of Classification Search ............ 369/263.1; 720/635, 611, 614, 643, 632, 600, 601
See application file for complete search history.

(56) References Cited

U.S. PATENT DOCUMENTS

| | | |
|---|---|---|
| 6,212,156 B1 | 4/2001 | Matsumoto et al. |
| 6,262,952 B1 | 7/2001 | Takai |
| 6,817,022 B1 | 11/2004 | Taniguchi et al. |
| 2004/0190392 A1 * | 9/2004 | Shirakawa et al. ...... 369/30.03 |
| 2005/0086672 A1 * | 4/2005 | Shimozaki ................. 720/619 |

FOREIGN PATENT DOCUMENTS

| | | |
|---|---|---|
| EP | 0 936 609 A2 | 8/1999 |
| EP | 0 980 072 A1 | 2/2000 |
| JP | 06-014316 | 4/1994 |
| JP | 11-045490 | 2/1999 |
| JP | 11-232753 | 8/1999 |
| JP | 2000-048459 | 2/2000 |
| JP | 2000-173150 | 6/2000 |
| JP | 2001-332004 | 11/2001 |
| WO | 00/54272 | 9/2000 |
| WO | 02/25655 A1 | 3/2002 |

* cited by examiner

*Primary Examiner*—Allen Cao
(74) *Attorney, Agent, or Firm*—Pearne & Gordon LLP

(57) ABSTRACT

Herein disclosed is an optical disk driving apparatus for selectively driving a plurality of optical disks, comprising: a housing; and an optical disk driving unit accommodated in the housing, the optical disk driving unit including: a turntable for selectively retaining the optical disks; a supporting member for rotatably supporting the turntable; a base plate pivotably retained by the housing; a plurality of vibration isolators for isolating the supporting member from outside vibrations by intervening between the supporting member and the base plate; a supporting member fixing mechanism for fixing the supporting member on the base plate by preventing the vibration isolators from isolating the supporting member from outside vibrations; a base plate driving mechanism for driving the base plate to pivotably move with respect to the housing; and a cam gear for transmitting a rotation torque to each of the supporting member fixing mechanism and the base plate driving mechanism.

6 Claims, 23 Drawing Sheets

FIG. 18
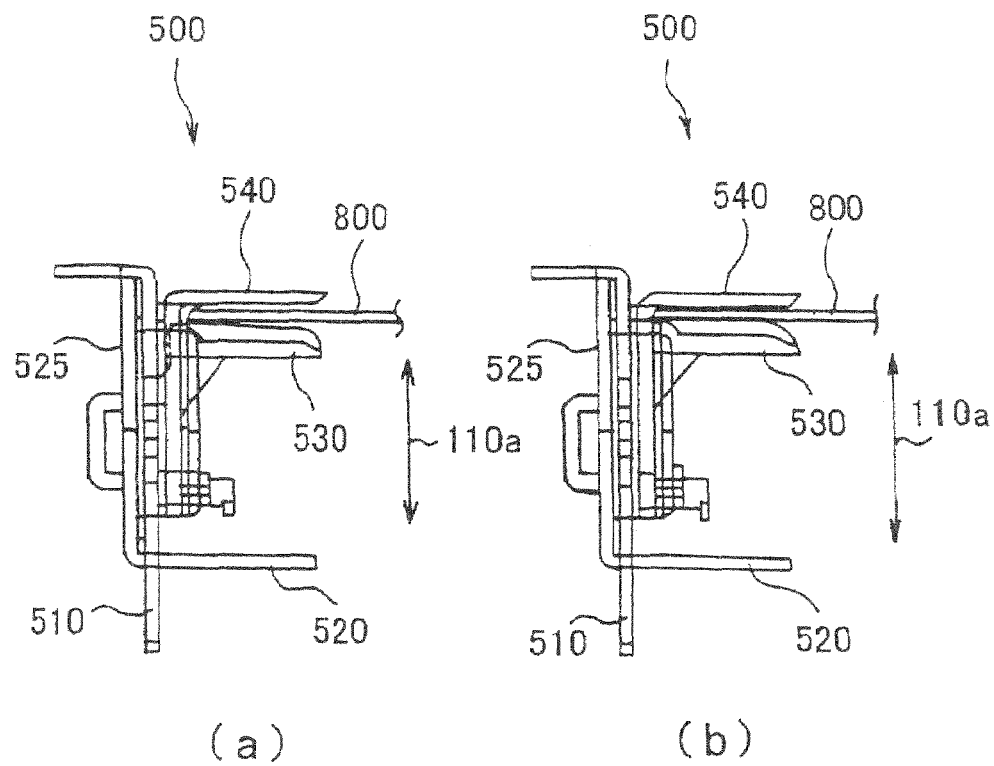
(a)　　　　　　　　(b)
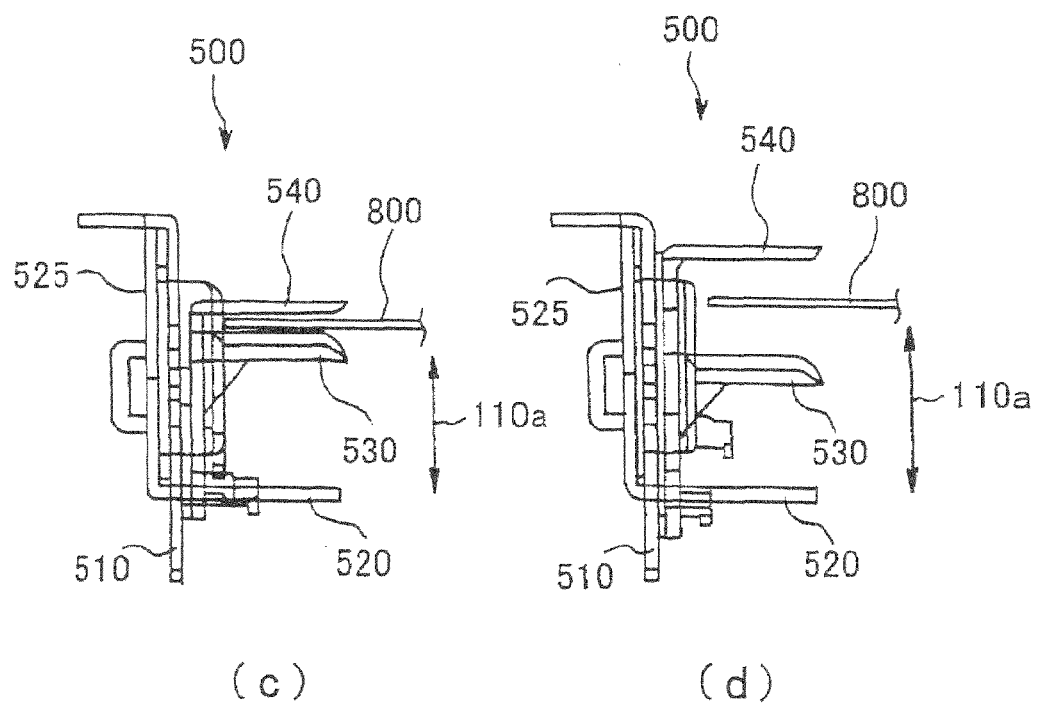
(c)　　　　　　　　(d)

FIG. 21
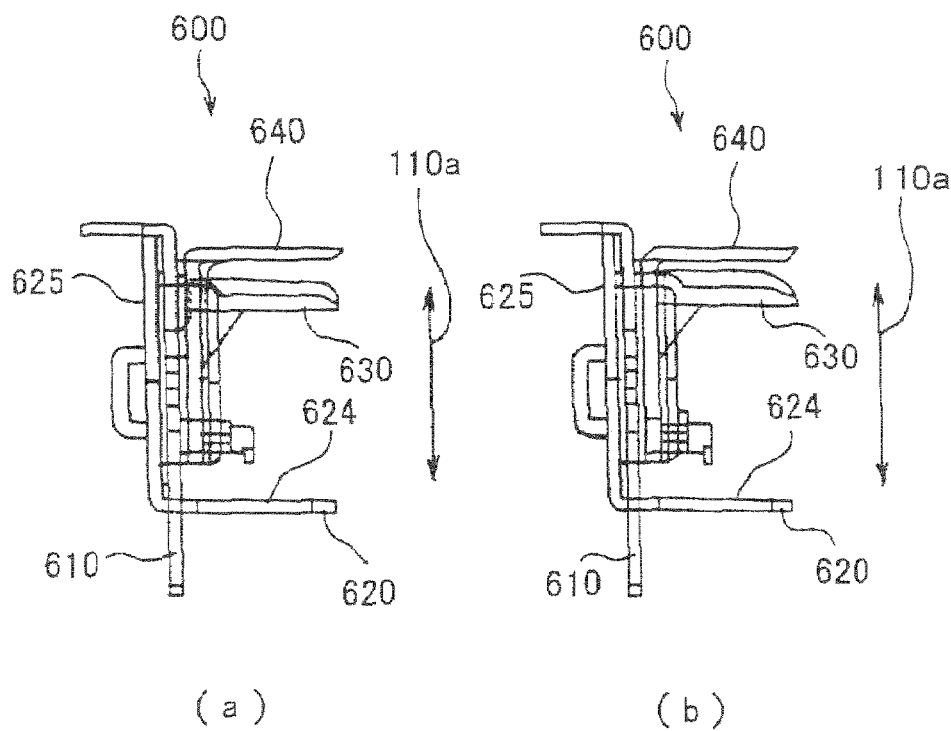
(a) (b)
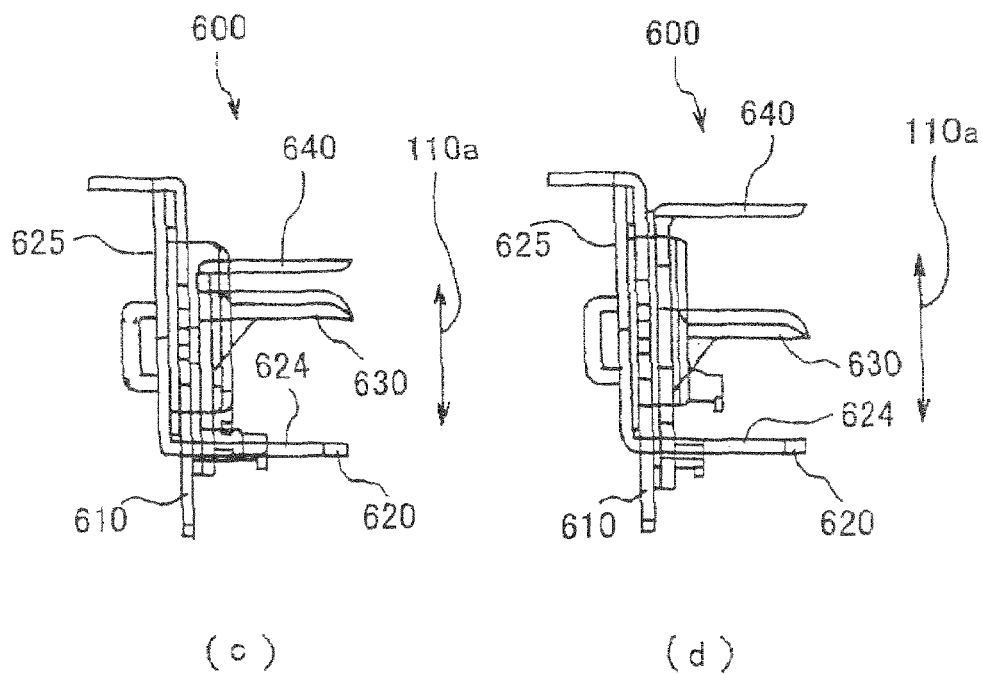
(c) (d)

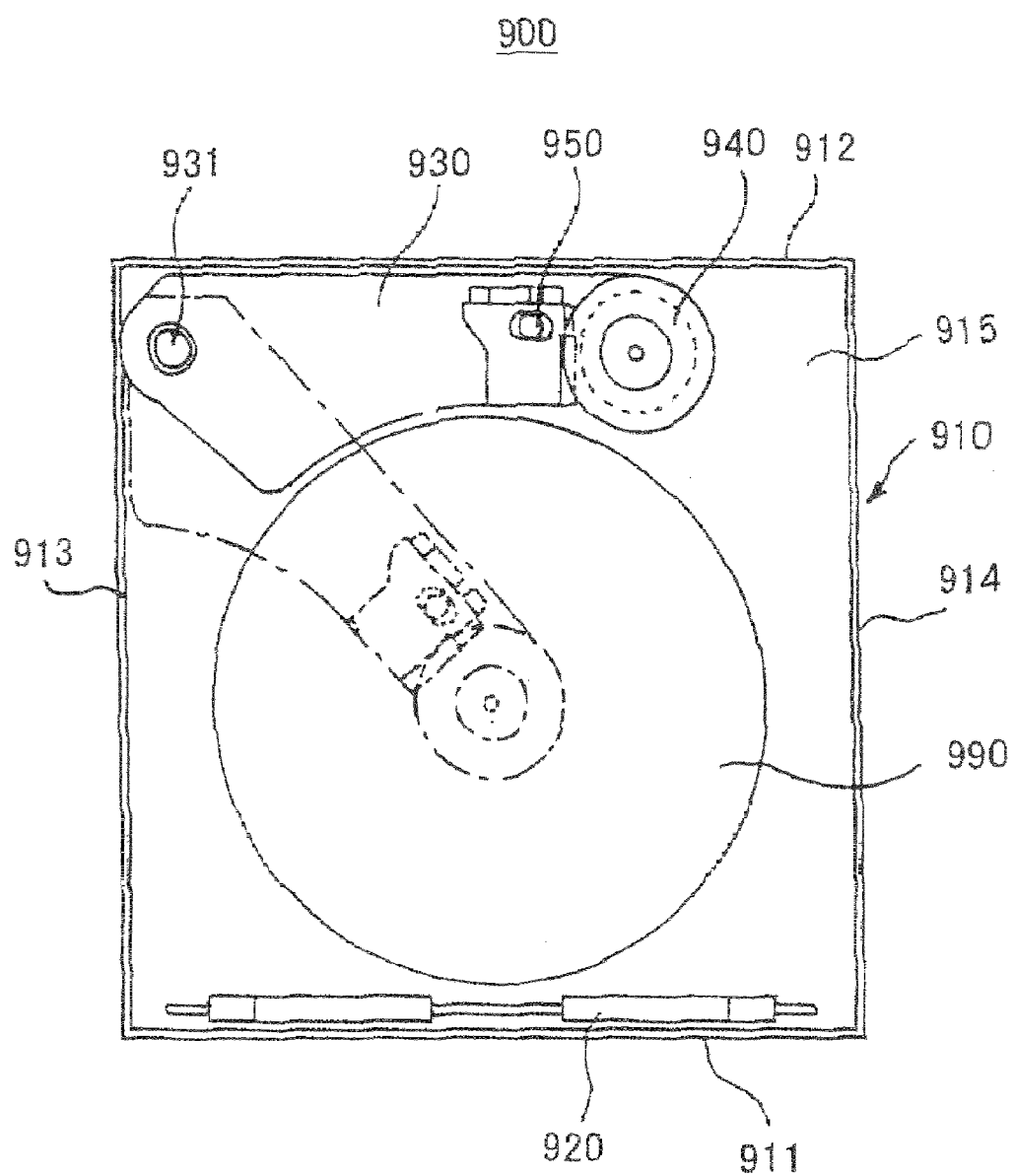

OPTICAL DISC DRIVING APPARATUS

BACKGROUND OF THE INVENTION

1. Field of the Invention

The present invention relates to an optical disk driving apparatus, and more particularly to an optical disk driving apparatus to be built in an automotive vehicle, and adapted to selectively drive a plurality of optical disks such as for example compact disks to move around its central axis, and reproduce information from data recorded in the optical disks.

2. Description of the Related Art

Up until now, there have been provided a wide variety of conventional optical disk driving apparatus of this type one typical example of which is shown in FIG. 28.

The conventional optical disk driving apparatus 900 is shown in FIG. 28 as comprising a box-shaped housing 910 to be built in an automotive vehicle, and an optical disk driving unit accommodated in the box-shaped housing 910. The box-shaped housing 910 includes a front plate 911 having formed therein a loading slot, a rear plate 912, first and second side plates 913 and 914, a top plate (not shown in FIG. 28), and a bottom plate 915. The front plate 911 is in parallel relationship with the rear plate 912. The first side plate 913 extends from the front plate 911 to the rear plate 912, while the second side plate 914 extends from the front plate 911 to the rear plate 912 under the state that the first side plate 913 is in parallel relationship with the second side plate 914. The top plate extends from the front plate 911 to the rear plate 912, while the bottom plate 915 extends from the front plate 911 to the rear plate 912 under the state that the top plate is in parallel relationship with the bottom plate 915.

The optical disk driving unit includes first to third motors (not shown in FIG. 28) for respectively producing rotation torques, a shutter plate (not shown in FIG. 28) disposed in the vicinity of the loading slot of the front plate 911 for the purpose of opening and shutting the loading slot of the front plate 911, a shutter plate driving mechanism (not shown in FIG. 28) for driving the shutter plate (not shown in FIG. 28) to move with respect to the loading slot of the front plate 911, a first cam gear (not shown in FIG. 28) for transmitting the rotation torque produced by the first motor to the shutter plate driving mechanism, and a loading roller 920 disposed in the vicinity of the loading slot of the front plate 911, and adapted to carry the optical disk in response to the rotation torque produced by the second motor.

The optical disk driving unit further includes a plurality of trays (not shown in FIG. 28) which are disposed in layers at specific intervals in the box-shaped housing 910, a push lever (not shown in FIG. 28) for pushing the optical disk 990 requested by the operator out of the trays, an optical disk guiding mechanism (not shown in FIG. 28) for guiding the optical disk 990 pushed by the push lever to the turntable 940, and a second cam gear (not shown in FIG. 28) for transmitting the rotation torque produced by the first motor to the optical disk guiding mechanism.

The optical disk driving unit further includes a base plate 310 pivotably supported by the box-shaped housing 910, a base plate driving mechanism (not shown in FIG. 28) for driving the base plate 310 to pivotably move with respect to the box-shaped housing 910, and a third cam gear (not shown in FIG. 28) for transmitting the rotation torque produced by the first motor to the driving mechanism.

The optical disk driving unit further includes a turntable 940 having a central axis, the turntable 940 being operative to have the optical disk requested by the operator move around a central axis thereof under the state that the central axis of the optical disk requested by the operator is aligned with the central axis thereof, a supporting member (not shown in FIG. 28) for rotatably supporting the turntable 940, and a plurality of vibration isolators (not shown) for isolating the supporting member 330 from outside vibrations by intervening between the supporting member 330 and the base plate 310.

The optical disk driving unit further includes a supporting member fixing mechanism for fixing the supporting member to the base plate without being isolated from the outside vibrations by the vibration isolators 321, 322, and 323, and a fourth cam gear (not shown in FIG. 28) for transmitting the rotation torque produced by the first motor to the supporting member fixing mechanism.

The optical disk driving apparatus thus constricted as previously mentioned, however, encounters such a problem that the rotation torque produced by the first motor tends to be untimely transmitted to each of the shutter plate driving mechanism, the optical disk guiding mechanism, the base plate driving mechanism, and the supporting member fixing mechanism in response to the outside vibrations.

SUMMARY OF THE INVENTION

It is, therefore, an object of the present invention to provide an optical disk driving apparatus which can ensure that the rotation torque produced by the first motor is timely transmitted to each of the shutter plate driving mechanism, the optical disk guiding mechanism, the base plate driving mechanism, and the supporting member fixing mechanism.

According to the first aspect of the present invention, there is provided an optical disk driving apparatus, comprising: a housing; and an optical disk driving unit accommodated in the housing, the optical disk driving unit including: a turntable for selectively retaining the optical disks; a supporting member for rotatably supporting the turntable; a base plate pivotably retained by the housing; a plurality of vibration isolators for isolating the supporting member from outside vibrations by intervening between the supporting member and the base plate; a supporting member fixing mechanism for fixing the supporting member on the base plate by preventing the vibration isolators from isolating the supporting member from outside vibrations; a base plate driving mechanism for driving the base plate to pivotably move with respect to the housing; and a cam gear for transmitting a rotation torque to each of the supporting member fixing mechanism and the base plate driving mechanism.

According to the second aspect of the present invention, there is provided an optical disk driving apparatus, comprising: a housing including a front plate having a loading slot formed therein; and an optical disk driving unit accommodated in the housing, the optical disk driving unit including: a shutter plate for shutting and opening the loading slot of the front plate; a shutter plate driving mechanism for driving the shutter plate to shut and open the loading slot of the front plate; a turntable for selectively retaining the optical disks; a supporting member for rotatably supporting the turntable; a base plate pivotably retained by the housing; a plurality of trays for respectively accommodating the optical disks; an optical disk guiding mechanism for guiding each of the optical disks to the turntable from the trays and vice versa; and a cam gear for transmitting a rotation torque to each of the shutter plate driving mechanism and the optical disk guiding mechanism.

According to the third aspect of the present invention, there is provided an optical disk driving apparatus, comprising: a housing including a front plate having a loading slot formed therein; and an optical disk driving unit accommodated in the housing, the optical disk driving unit including: a shutter plate for shutting and opening the loading slot of the front plate; a shutter plate driving mechanism for driving the shutter plate to shut and open the loading slot of the front plate; a turntable for selectively retaining the optical disks; a supporting member for rotatably supporting the turntable; a base plate pivotably retained by the housing; a plurality of trays disposed in layers at specific intervals, and adapted to accommodate the optical disks respectively; an interval adjusting mechanism for adjusting each of the intervals of the trays; an optical disk guiding mechanism for guiding each of the optical disks to the turntable from the trays and vice versa; and a cam gear for transmitting a rotation torque to each of the shutter plate driving mechanism, the optical disk guiding mechanism, and the interval adjusting mechanism.

According to the fourth aspect of the present invention, there is provided an optical disk driving apparatus, comprising: a housing including a front plate having a loading slot formed therein; and an optical disk driving unit accommodated in the housing, the optical disk driving unit including: a shutter plate for shutting and opening the loading slot of the front plate; a shutter plate driving mechanism (104) for driving the shutter plate to shut and open the loading slot of the front plate; a turntable for selectively retaining the optical disks; a supporting member for rotatably supporting the turntable; a base plate pivotably retained by the housing; a plurality of vibration isolators for isolating the supporting member from outside vibrations by intervening between the supporting member and the base plate; a supporting member fixing mechanism for fixing the supporting member on the base plate by preventing the vibration isolators from isolating the supporting member from outside vibrations; a base plate driving mechanism for driving the base plate to pivotably move with respect to the housing; a plurality of trays for respectively accommodating the optical disks; an interval adjusting mechanism for adjusting each of the intervals of the trays; an optical disk guiding mechanism for guiding each of the optical disks to the turntable from the rays and vice versa; a first cam gear for transmitting a rotation torque to each of the supporting member fixing mechanism and the base plate driving mechanism; a second cam gear for transmitting the rotation torque to each of the shutter plate driving mechanism and the optical disk guiding mechanism; and a transmission gear for transmitting the rotation torque to each of the first cam gear and the second cam gear.

According to the fifth aspect of the present invention, there is provided an optical disk driving apparatus, comprising: a housing including a front plate having a loading slot formed therein; and an optical disk driving unit accommodated in the housing, the optical disk driving unit including: a shutter plate for shutting and opening the loading slot of the front plate; a shutter plate driving mechanism for driving the shutter plate to shut and open the loading slot of the front plate; a turntable for selectively retaining the optical disks; a supporting member for rotatably supporting the turntable; a base plate pivotably retained by the housing; a plurality of vibration isolators for isolating the supporting member from outside vibrations by intervening between the supporting member and the base plate; a supporting member fixing mechanism for fixing the supporting member on the base plate by preventing the vibration isolators from isolating the supporting member from outside vibrations; a base plate driving mechanism for driving the base plate to pivotably move with respect to the housing; a plurality of trays for respectively accommodating the optical disks; an optical disk guiding mechanism for guiding each of the optical disks to the turntable from the rays and vice versa; a first cam gear for transmitting a rotation torque to each of the supporting member fixing mechanism and the base plate driving mechanism; a second cam gear for transmitting the rotation torque to each of the shutter plate driving mechanism, the optical disk guiding mechanism, and the interval adjusting mechanism; and a transmission gear for transmitting the rotation torque to each of the first cam gear and the second cam gear.

According to the sixth aspect of the present invention, there is provided an optical disk driving apparatus, comprising: a housing including a front plate having a loading slot formed therein; and an optical disk driving unit accommodated in the housing, the optical disk driving unit including: a turntable for selectively retaining the optical disks; a supporting member for rotatably supporting the turntable; a base plate pivotably retained by the housing; a plurality of trays for respectively accommodating the optical disks under the state that the central axis of each of the optical disks are in parallel relationship with one another; and a plurality of vibration isolators each having a central axis, and adapted to isolate the supporting member from outside vibrations by intervening between the supporting member and the base plate, the vibration isolators being disposed on the base plate under the state that the central axis of each of the vibration isolators is in parallel relationship with central axis of each of the optical disks accommodated in the trays.

According to the seventh aspect of the present invention, there is provided an optical disk driving apparatus, comprising: a housing; and an optical disk driving unit accommodated in the housing, the optical disk driving unit including: a turntable for selectively retaining the optical disks; a supporting member for rotatably supporting the turntable; a base plate pivotably retained by the housing, and adapted to assume first and second operational positions; a base plate driving mechanism for pivotally driving the base plate to assume each of the first and second operational positions and, the base plate driving mechanism including an urging mechanism for urging the base plate to the first operational position when the base plate assumes the first operation position, and urging the base plate to the second operational position when the base plate assumes the second operation position.

According to the eighth aspect of the present invention, there is provided an optical disk driving apparatus, comprising: a housing; and an optical disk driving unit accommodated in the housing, the optical disk driving unit including: a turntable for selectively retaining the optical disks; a supporting member for rotatably supporting the turntable; a base plate pivotably retained by the housing; a plurality of vibration isolators for isolating the supporting member from outside vibrations by intervening between the supporting member and the base plate; and a supporting member fixing mechanism for fixing the supporting member on the base plate by preventing the vibration isolators from isolating the supporting member from outside vibrations, the supporting member fixing mechanism including a plurality of engaging members for engaging with each of the supporting member and the base plate at operation timings which are different from one another, and in operation directions which are different from one another.

According to the ninth aspect of the present invention, there is provided an optical disk driving apparatus, comprising: a housing; and an optical disk driving unit accommodated in the housing, the optical disk driving unit including: a plurality of trays for respectively accommodating the optical disks; a first urging mechanism for urging the trays to have the trays approach one another under the state that the trays are disposed in layers at specific intervals; and a second urging mechanism for urging the trays toward the housing.

BRIEF DESCRIPTION OF THE DRAWINGS

The features and advantages of an optical disk driving apparatus according to the present invention will be more clearly understood from the following description taken in conjunction with the accompanying drawings in which:

FIGS. 18(a) to (d) are a front view of a first optical disk guiding mechanism of the optical disk driving unit of the optical disk driving apparatus according to the preferred embodiment of the present invention;

FIGS. 21(a) to (d) are a front view of a second optical disk guiding mechanism of the optical disk driving apparatus according to a preferred embodiment of the present invention;

FIG. 28 is a top view of the conventional optical disk driving apparatus.

DESCRIPTION OF THE EMBODIMENTS

Figure 1:
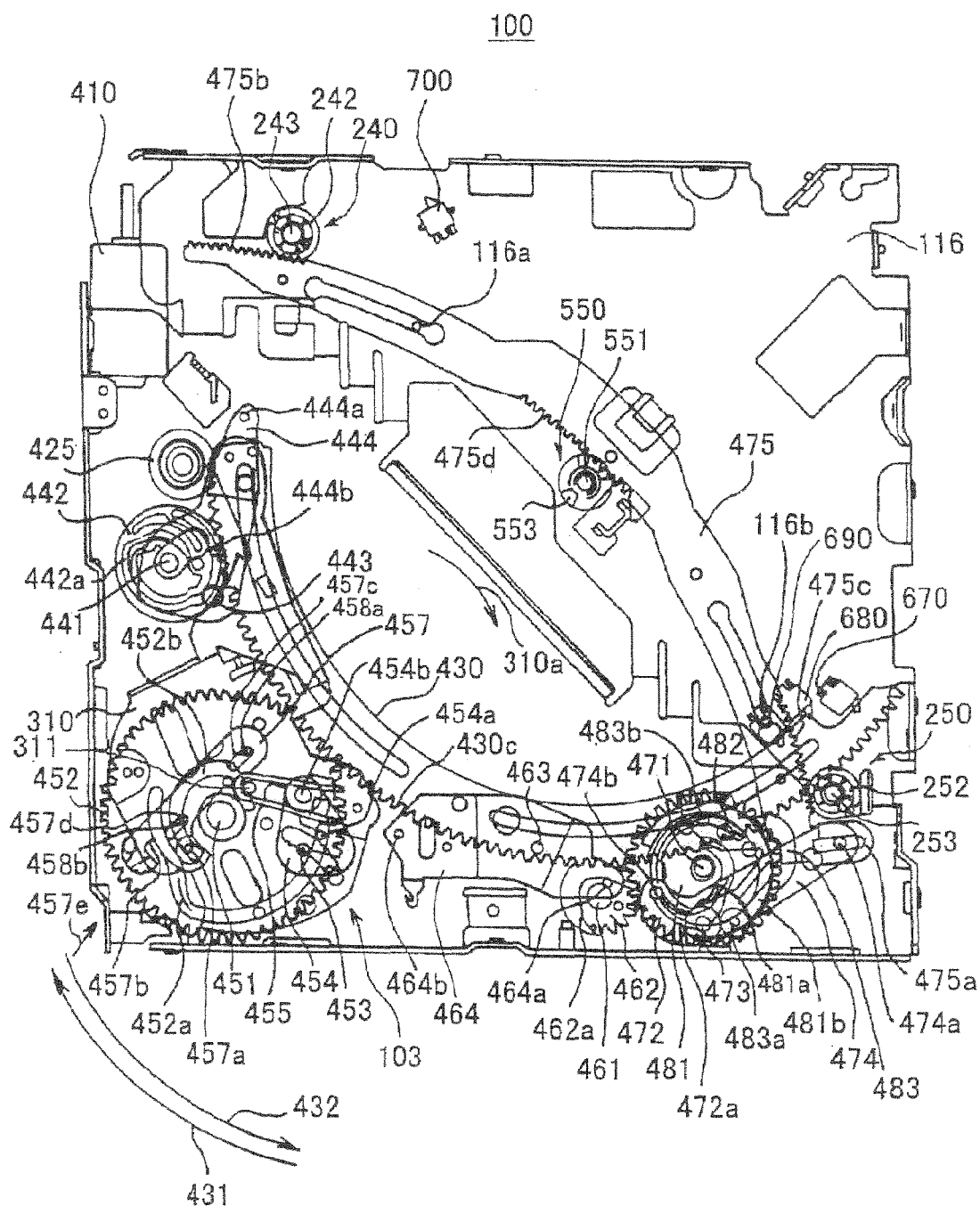
FIG. 1 is a top view of an optical disk driving unit forming part of the optical disk driving apparatus according to a preferred embodiment of the present invention.

The following description will be directed to the preferred embodiment of the optical disk driving apparatus according to the present invention.

The constitution of the preferred embodiment of the optical disk driving apparatus according to the present invention will be described hereinafter with reference to FIGS. 1 to 22.

The optical disk driving apparatus 100 is shown in FIGS. 1 to 22 as including a box-shaped housing 110 and an optical disk driving unit 101 accommodated in the box-shaped housing 110. The box-shaped housing 110 includes a front plate 111 having formed therein a loading slot (not shown), a rear plate 112, first and second side plates 113 and 114, a top plate 115, and a bottom plate 116. The front plate 111 is in parallel relationship with the rear plate 112. The first side plate 113 extends from the front plate 111 to the rear plate 112, while the second side plate 114 extends from the front plate 111 to the rear plate 112 under the state that the first side plate 113 is in parallel relationship with the second side plate 114. The top plate 115 extends from the front plate 111 to the rear plate 112, while the bottom plate 116 extends from the front plate 111 to the rear plate 112 under the state that the top plate 115 is in parallel relationship with the bottom plate 116.

The optical disk driving apparatus 100 further includes a plurality of trays 131 to 136 which are in parallel relationship with one another, and stacked with one another in the box-shaped housing 110, a first metal plate 141 to be provided between the top plate 115 and the tray 131, and a second metal plate 142 to be provided between the bottom plate 116 and the tray 136. The first metal plate 141 is in parallel relationship with each of the trays 131 to 136, while the second metal plate 142 is in parallel relationship with each of the trays 131 to 136. Each of the trays 131 to 136 is semi-annular, or semi-circular in shape. The trays 131 to 136 have respectively formed therein projected rim portions 131*a* to 136*a* each defining a specific space receiving the optical disk 800 inserted by the operator through the loading slot (not shown) of the front plate 111. The trays 131 to 136 are disposed in layers in the box-shaped housing 110.

Figure 3:
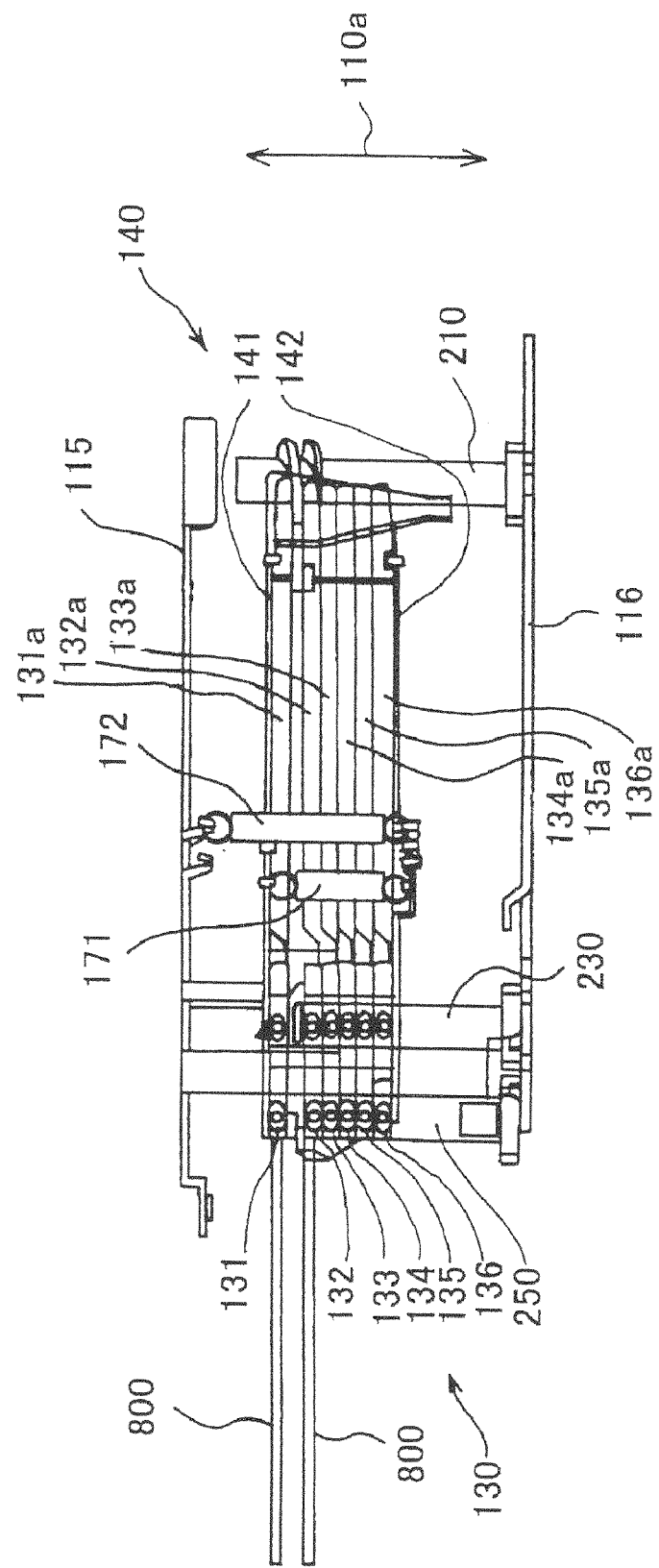
FIG. 3 is a fragmental side view of the optical disk driving unit forming part of the optical disk driving apparatus according to the preferred embodiment of the present invention.

The optical disk driving apparatus 100 further includes three guide shafts 151 to 153 each integrally formed with the box-shaped housing 110, while central axes of the three guide shafts 151 to 153 are in parallel relationship with one another, and each extends in the direction indicated by an arrow 11*a* shown in FIG. 3. The first and second metal plates 141 and 142 each has formed therein three through holes (not shown) which have the three guide shafts 151 to 153 received therein respectively, while the trays 131 to 136 each has formed therein three through holes (not shown) which have the three guide shafts 151 to 153 received therein respectively.

Figure 2:
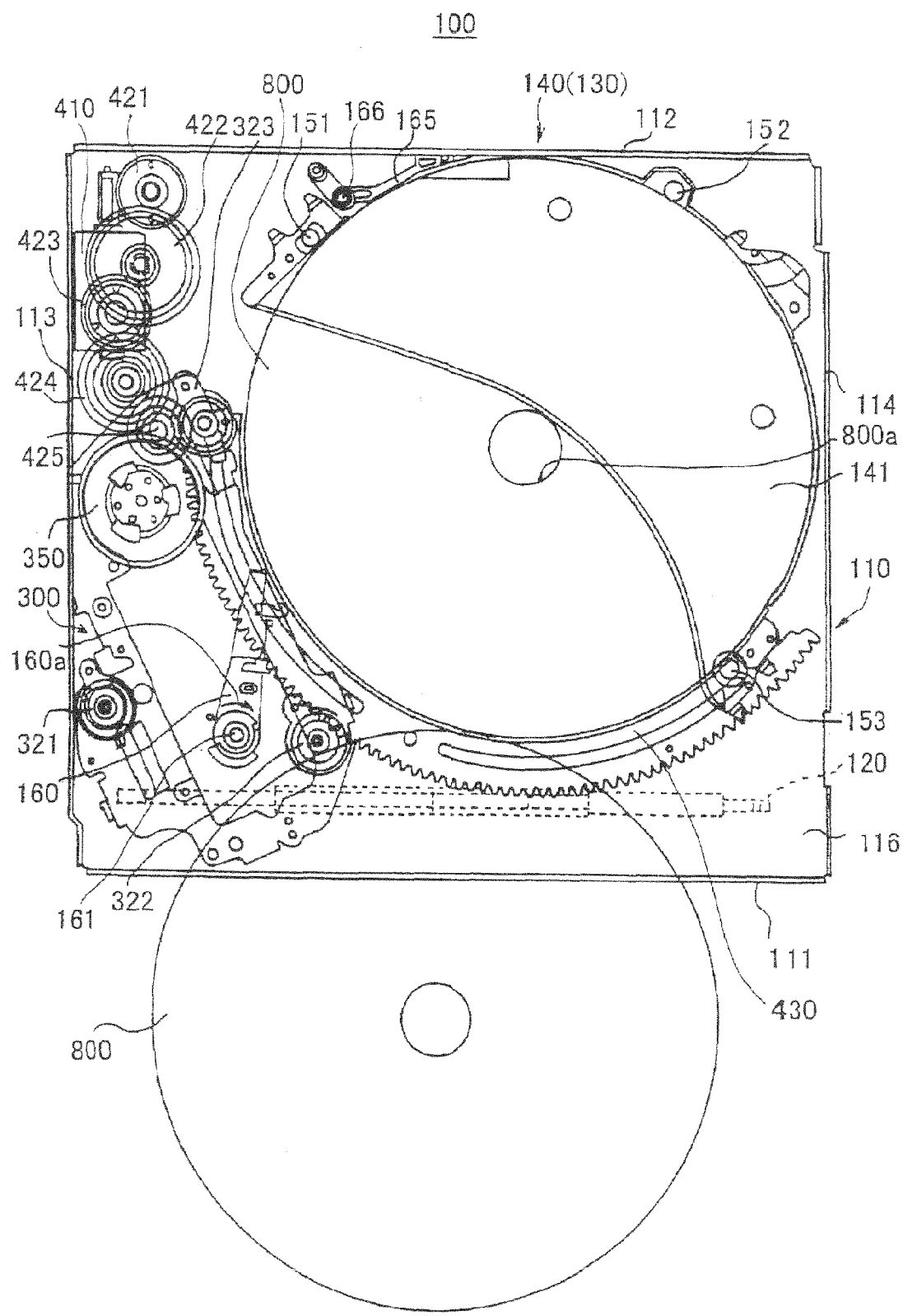
FIG. 2 is a top view of the optical disk driving unit forming part of the optical disk driving apparatus according to the preferred embodiment of the present invention.

The optical disk driving apparatus 100 further includes an adjusting lever 160 pivotably supported by the box-shaped housing 110, and urged by a spring (not shown) in the direction indicated by an arrow 160*a* shown in FIG. 2. The adjusting lever 160 is adapted to have the optical disk 800 inserted by the operator move in the direction of toward the trays 131 to 136. The optical disk driving apparatus 100 further includes a shaft 166 integrally formed with the box-shaped housing 110, the shaft 166 having a central axis 161, a push lever 165 pivotably supported by the shaft 166, and a driving mechanism (not shown) for driving the push lever 165 to have the push lever 165 pivotably move around the shaft 166. The push lever 165 is operative to push the optical disk 800 accommodated in each of the trays 130 in the direction of toward the turntable 350 by pivotally moving around the central axis 161 of the pivotal axis 166.

The optical disk driving apparatus 100 further includes a first coil spring 171 having one end portion fixed to the first metal plate 141 and the other end portion fixed to the second metal plate 142, and a second coil spring 172 having one end portion fixed to the top plate 115 and the other end portion fixed to the second metal plate 142. The first coil spring 171 is operative to urge each of the metal plates 141 and 142 to have the metal plates 141 and 142 approach each other. The second coil spring 172 is operative to urge each of the top plate 115 and the second metal plate 142 to have each of the top plate 115 and the second metal plate 142 approach each other.

Figure 4:
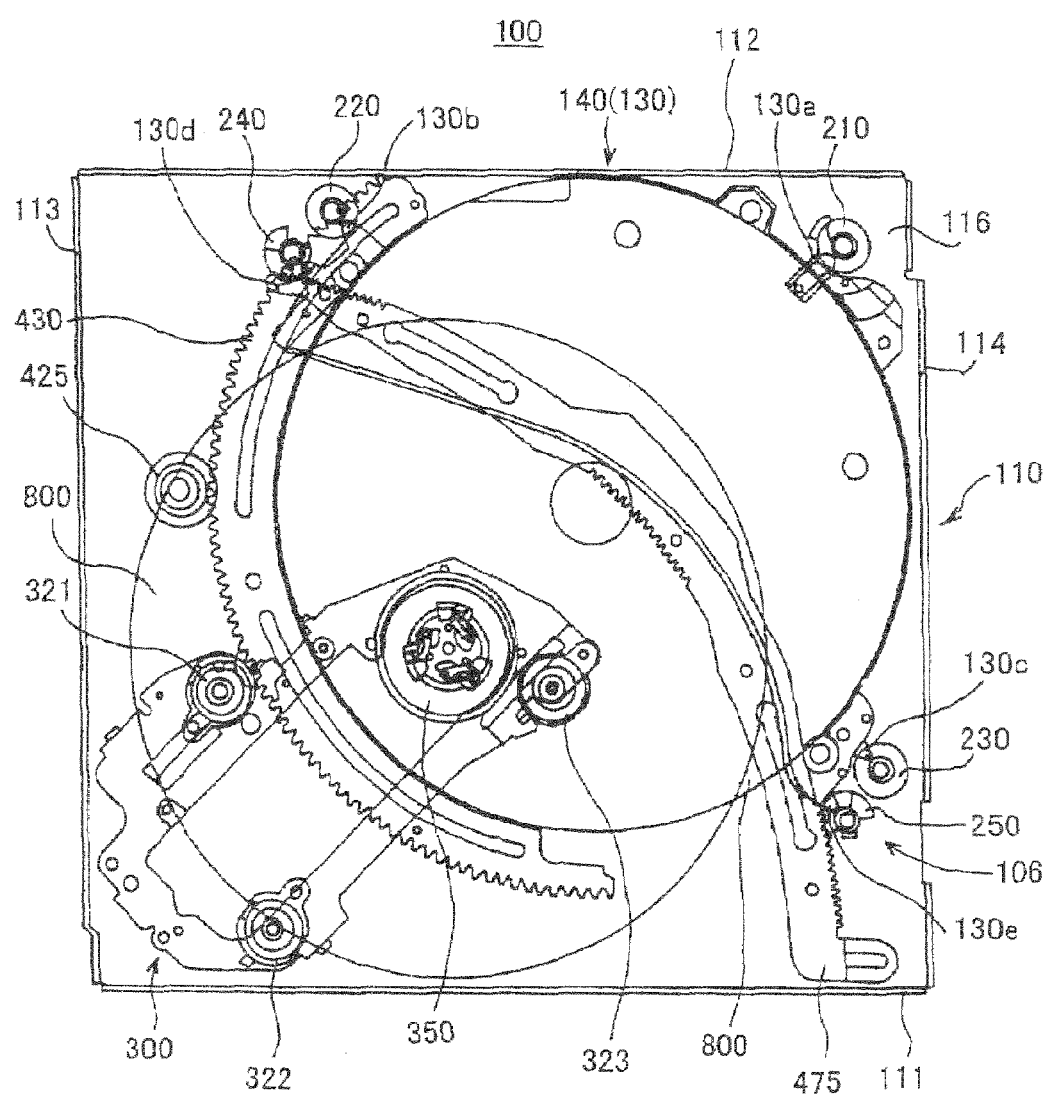
FIG. 4 is a top view of the optical disk driving unit forming part of the optical disk driving apparatus according to the preferred embodiment of the present invention.
Figure 5:
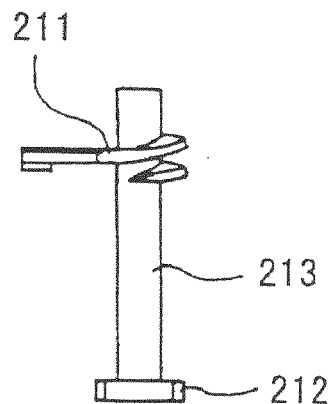
FIG. 5 is a side view of the cam gear forming part of the optical disk driving unit of the optical disk driving apparatus according to the preferred embodiment of the present invention.

The trays 131 to 136 each has projected portions 130*a* to 130*e* in a peripheral portion thereof. The optical disk driving apparatus 100, as shown in FIGS. 4 and 5, further includes a cam gear 210 having three different portions consisting of a shaft portion 213 rotatably supported by the box-shaped housing 110, a spiral-shaped cam portion 211 held in engagement with the projected portion 130*a* (see FIG. 4) of each of the trays 131 to 136, and a gear portion 212 integrally formed with the spiral-shaped shaft portion 211 and axially aligned with the shaft portion 213.

Figure 6:
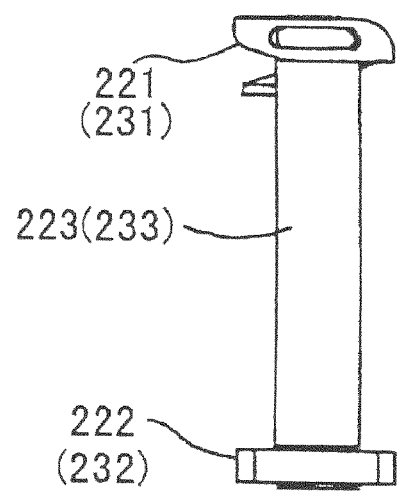
FIG. 6 is a side view of the cam gears forming part of the optical disk driving unit of the optical disk driving apparatus according to the preferred embodiment of the present invention.
Figure 7:
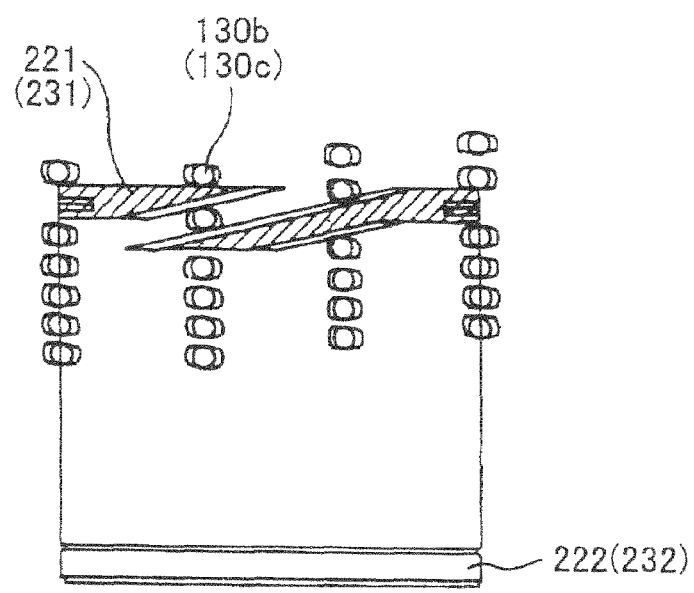
FIG. 7 is an expansional side view of the cam gears shown in FIG. 6.

The optical disk driving unit 101, as shown in FIGS. 6 and 7, further includes a cam gear 220 having three different portions consisting of a shaft portion 223 rotatably supported by the box-shaped housing 110, a spiral-shaped cam portion 221 held in engagement with the projected portion 130*b* (see FIG. 4) of each of the trays 131 to 136, and a gear portion 222 integrally formed with the shaft portion 223 and axially aligned with the shaft portion 223.

The optical disk driving unit 101, as shown in FIGS. 6 and 7, further includes a cam gear 230 having three different portions consisting of a shaft portion 233 rotatably supported by the box-shaped housing 110, a spiral-shaped cam portion 231 held in engagement with the projected portion 130*c* (see FIG. 4) of each of the trays 131 to 136, and a gear portion 232 integrally formed with the shaft portion 233 and axially aligned with the shaft portion 233.

Figure 8:
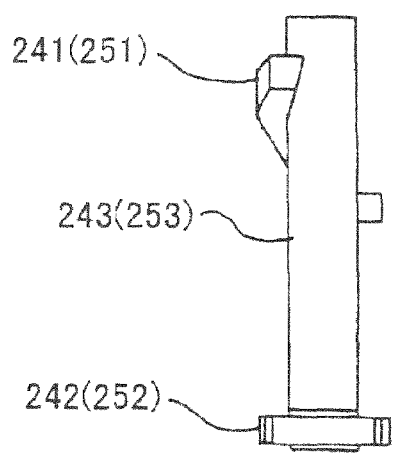
FIG. 8 is a side view of the cam gears forming part of the optical disk driving unit of the optical disk driving apparatus according to the preferred embodiment of the present invention.
Figure 9:
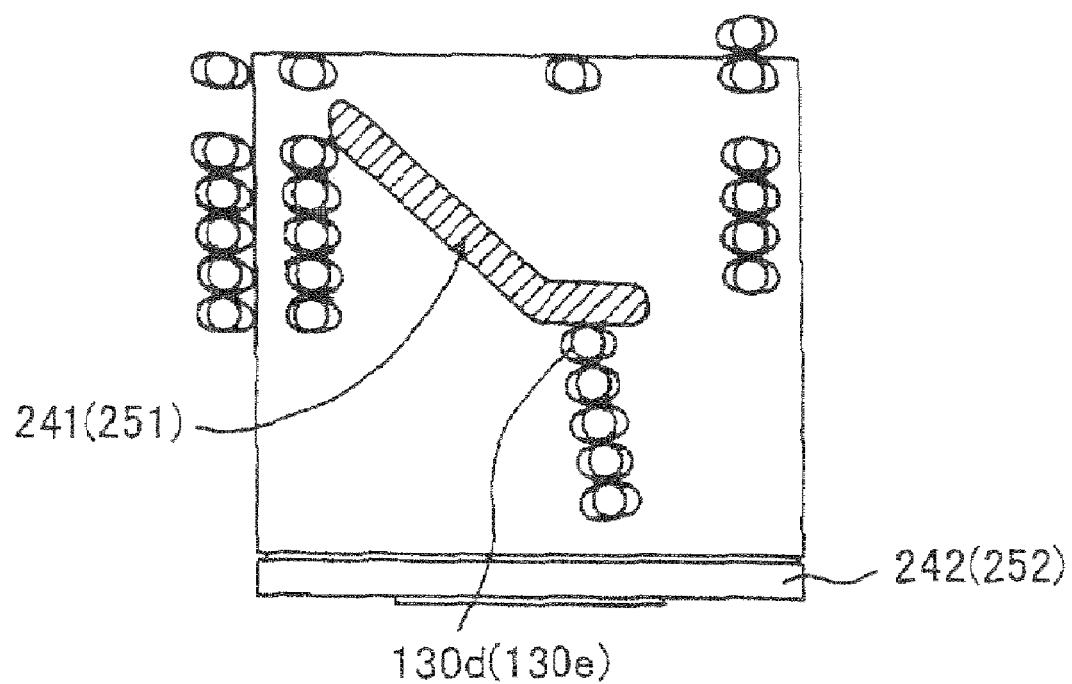
FIG. 9 is an expansional side view of the cam gears shown in FIG. 8.

The optical disk driving unit 101, as shown in FIGS. 8 and 9, further includes a cam gear 240 having three different portions consisting of a shaft portion 243 rotatably supported by the box-shaped housing 110, a spiral-shaped cam portion 241 held in engagement with the projected portion 130*d* (see FIG. 4) of each of the trays 131 to 136, and a gear portion 242 integrally formed with the shaft portion 243 and axially aligned with the shaft portion 243.

The optical disk driving unit 101, as shown in FIGS. 8 and 9, further includes a cam gear 250 having three different portions including a shaft portion 253 rotatably supported by the box-shaped housing 110, a spiral-shaped cam portion 251 held in engagement with the projected portion 130*e* (see FIG. 4) of each of the trays 131 to 136, and a gear portion 252 integrally formed with the shaft portion 253 under the state that a central axis of the gear portion 252 is axially aligned with a central axis of the shaft portion 253.

Figure 10:
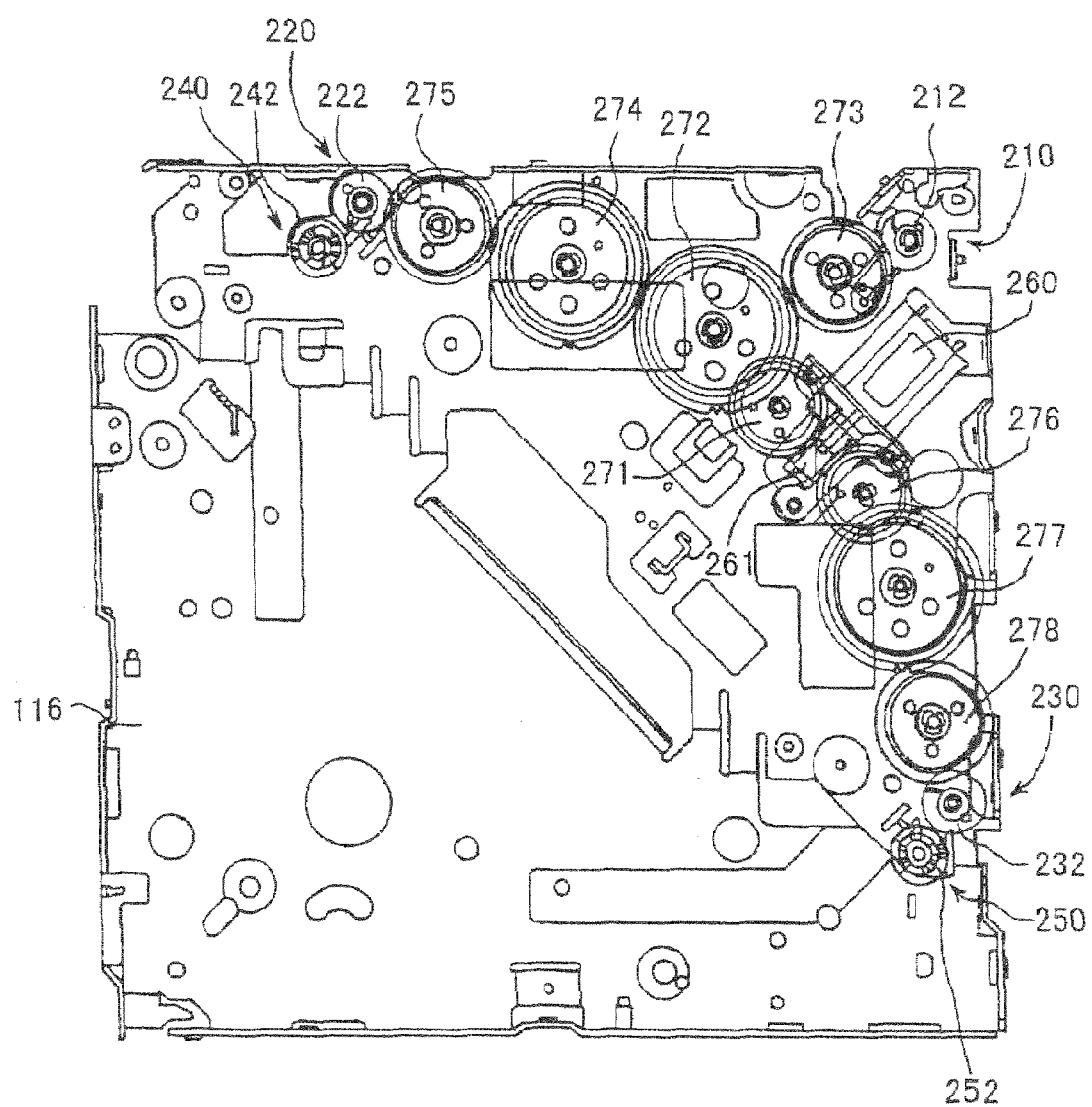
FIG. 10 is a top view of the optical disk driving unit shown in FIG. 1.

The optical disk driving unit 101, as shown in FIG. 10, further includes a first driving motor 260 having a driving shaft, a worm gear 261 securely formed with the driving shaft of the first driving motor 260, a gear 271 rotatably supported by the box-shaped housing 110 and meshed with the worm gear 261, a gear 272 rotatably supported by the box-shaped housing 110 and meshed with the gear 271, and a gear 273 rotatably supported by the box-shaped housing 110 and meshed with the gear 272. The first driving motor 260 is operative to produce and transmit a rotation torque to the cam gear 210 through the gears 271 to 273, and to have the cam gear 210 rotatably move with respect to the box-shaped housing 110.

The optical disk driving unit 101 further includes a gear 274 rotatably supported by the box-shaped housing 110 and meshed with the gear 272, and a gear 275 rotatably supported by the box-shaped housing 110 and meshed with the gear 274. The first driving motor 260 is operative to produce and transmit a rotation torque to the cam gear 220 through the gears 271, 272, 274, and 275, and to have the cam gear 220 rotatably moved with respect to the box-shaped housing 110.

The optical disk driving unit 101 further includes a gear 276 rotatably supported by the box-shaped housing 110 and meshed with the worm gear, a gear 277 rotatably supported by the box-shaped housing 110 and meshed with the gear 276, and a gear 278 rotatably supported by the box-shaped housing 110 and meshed with the gear 277. The first driving motor 260 is operative to produce and transmit a rotation torque to the cam gear 230 through the gears 276 to 278, and to have the cam gear 230 rotatably moved with respect to the box-shaped housing 110.

Figure 11:
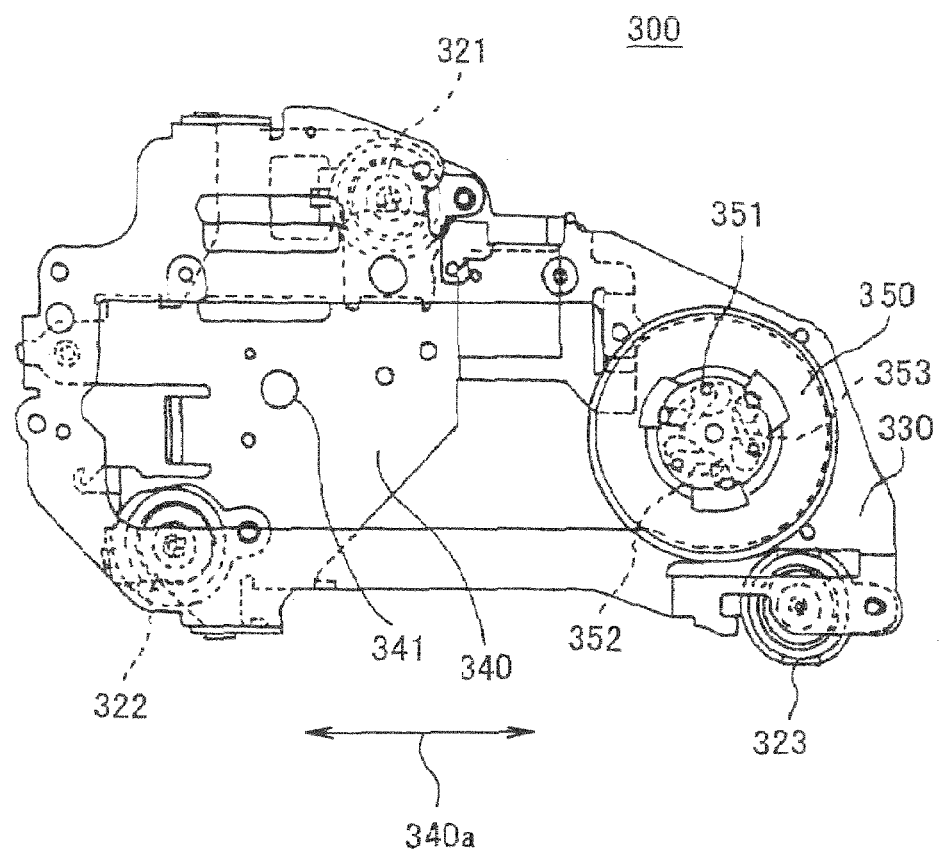
FIG. 11 is a top view of an optical pickup unit of the optical disk driving apparatus according to the preferred embodiment of the present invention.
Figure 12:
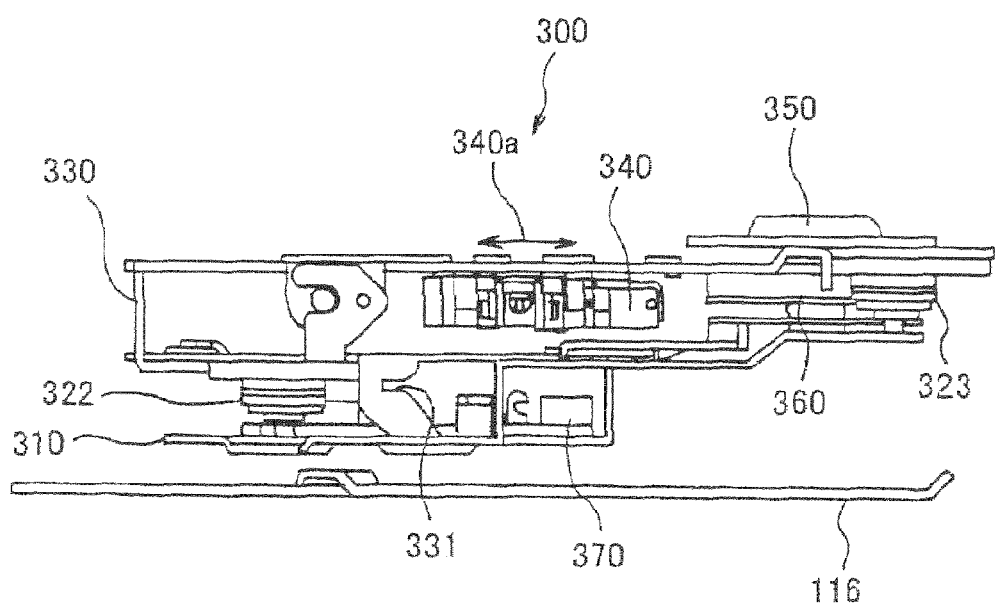
FIG. 12 is a side view of the optical pickup unit of the optical disk driving apparatus according to the preferred embodiment of the present invention.
Figure 13:
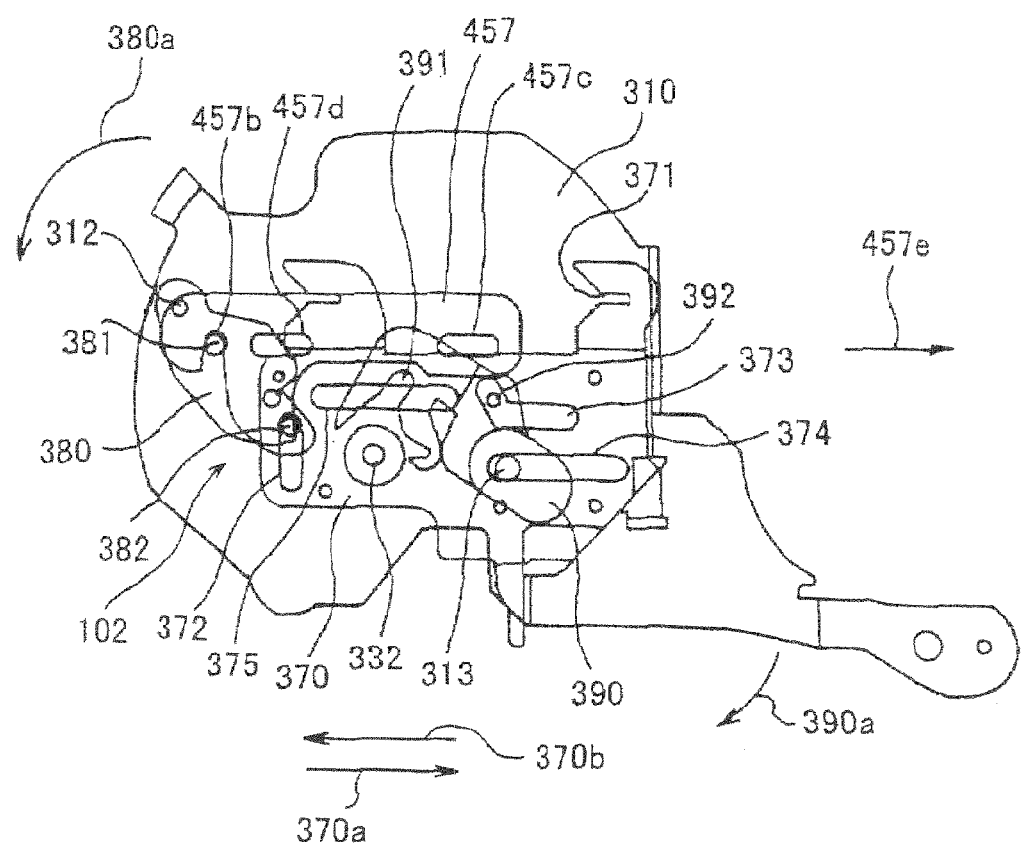
FIG. 13 is a top view of the optical pickup unit of the optical disk driving apparatus shown in FIG. 11.
Figure 14:
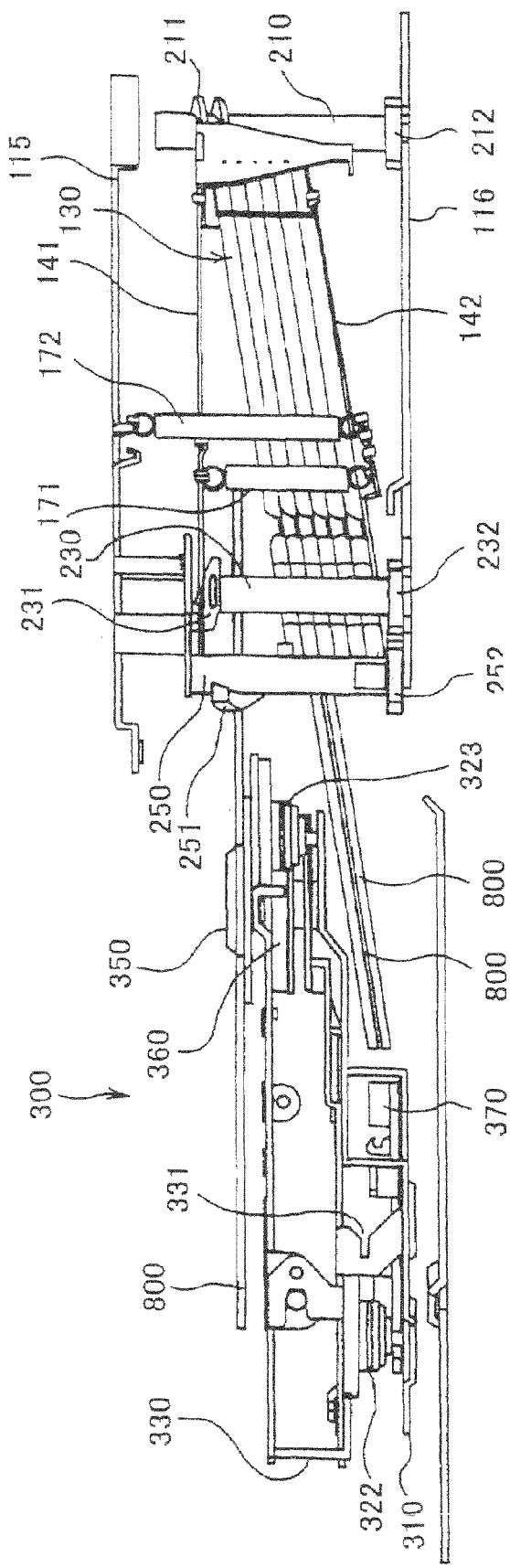
FIG. 14 is a fragmentally enlarged side view of the optical disk driving unit of the optical disk driving apparatus according to the preferred embodiment of the present invention.

The optical disk driving unit 101, as shown in FIGS. 11 to 13, further includes a base plate 310 pivotably supported by the box-shaped housing 110, a supporting member 330 for rotatably supporting the turntable 350, and a plurality of vibration isolators 321 to 323 each supported by the base plate 310. The vibration isolators 321 to 323 are adapted to isolate the supporting member 330 from outside vibrations by intervening between the supporting member 330 and the base plate 310. The base plate 310, the supporting member 330, and the vibration isolators collectively constitute an optical pickup unit 300.

The supporting member 330 includes a light emitting device (not shown) for emitting a laser beam toward the optical disk 800 mounted on the turntable 350, a light receiving device (not shown) for receiving a laser beam by way of the optical disk 800 mounted on the turntable 350, a second driving motor 360 for driving the turntable 350 to have the turntable 350 move around the central axis of the turntable 350. The turntable 350 having cramp members 351, 352, and 353 for securely retaining the optical disk 800 on the turntable. The cramp members 351, 352, and 353 (see FIG. 11) partially constitute an optical disk cramp mechanism.

The optical disk driving unit 101 further includes a slide plate 370 having grooves 371 and 372, cam groove 373, a groove 374 receiving a shaft 313 integrally formed with the base plate 310, and a groove 375 receiving a shaft (not shown) integrally formed with the base plate 310. The slide plate 370 is adapted to slidably move with respect to the base plate 310 in the direction indicated by the arrows 370a and 370b which is in parallel relationship with the arrow 340a. The optical disk driving unit 101 further includes a lever 380 pivotably supported by a shaft 312 integrally formed with the base plate 310. The lever 380 has a shaft 381 and a shaft 382 received by the groove 372 of the slide plate 370. The optical disk driving unit 101 further includes a lever 390 pivotably supported by a shaft 313 integrally formed with the base plate 310. The lever 390 has a shaft 391 and a shaft 392 received by the groove 373 of the slide plate 370.

The vibration isolators 321 to 323 are respectively disposed on the base plate 310 under the state that a central axis of each of the vibration isolators 321 to 323 is in parallel relationship with a central axis of the turntable 350.

Figure 15:
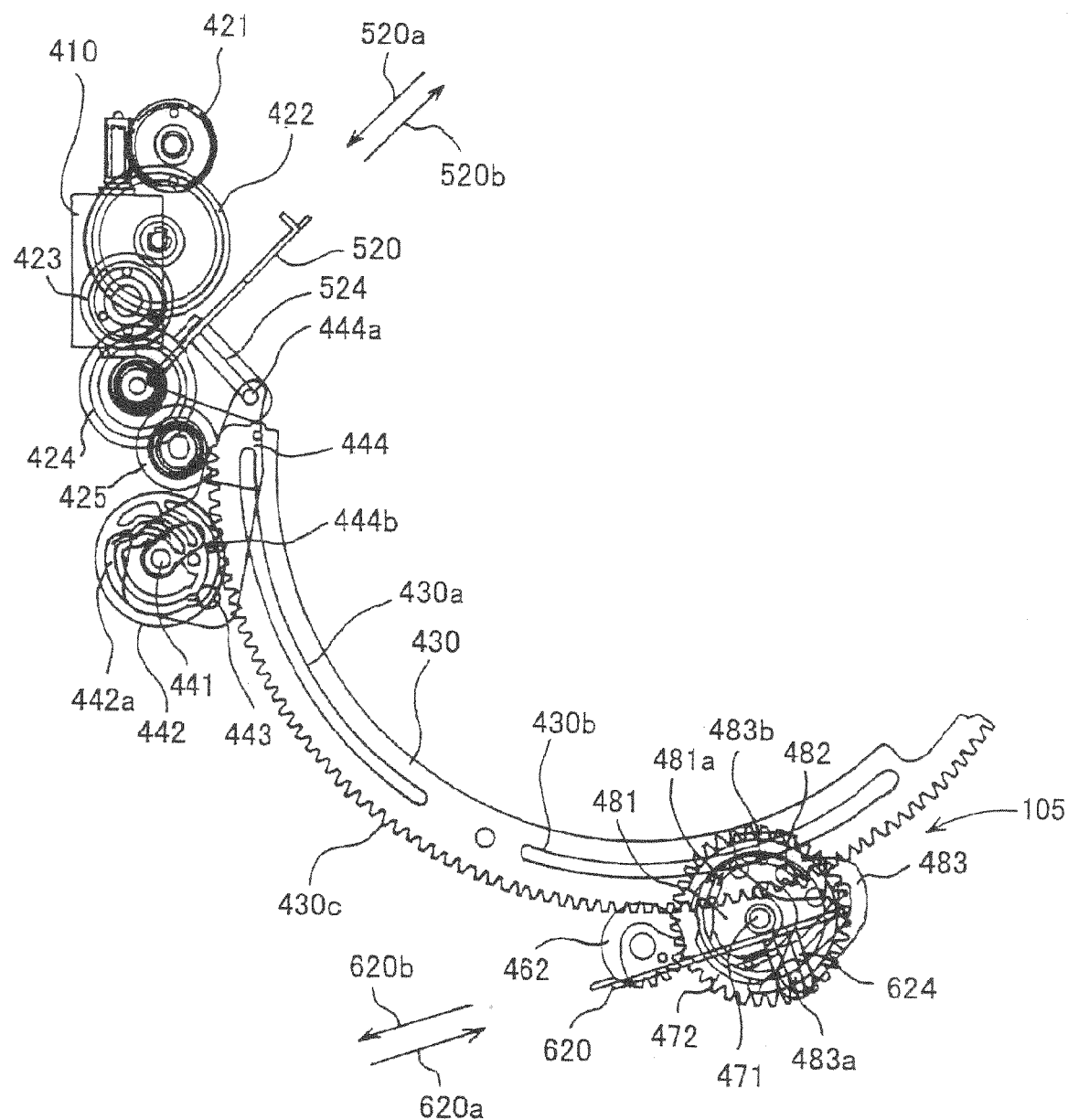
FIG. 15 is a top view of an arcuate-shaped slide plate and a vicinity of the arcuate-shaped slide plate of the optical disk driving unit of the optical disk driving apparatus according to the preferred embodiment of the present invention.
Figure 16:
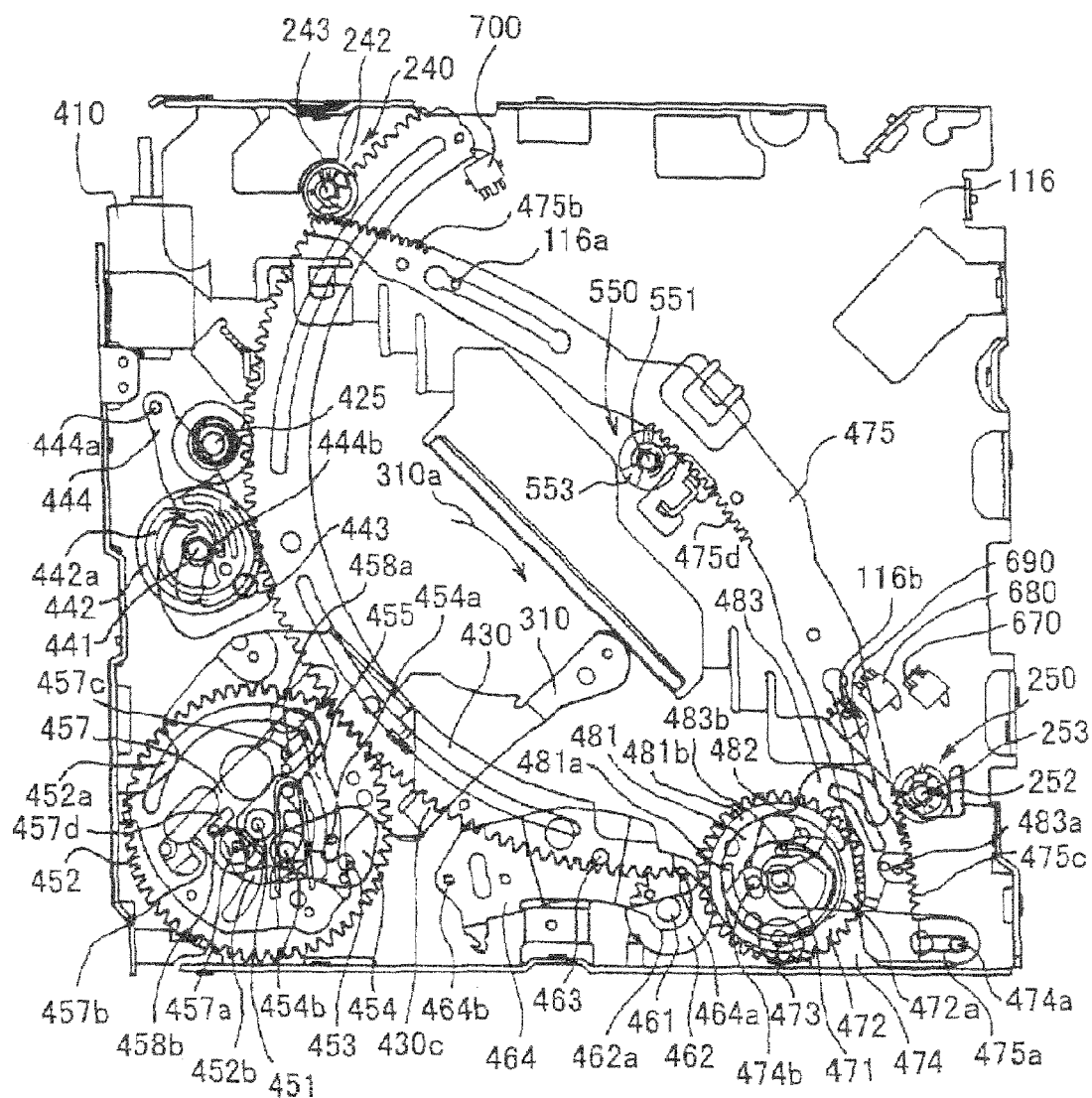
FIG. 16 is a top view of an optical disk driving unit shown in FIG. 1.

The optical disk driving unit 101, as shown in FIGS. 15 to 16, further includes a third driving motor 410 supported by the first side plate 113 (see FIG. 2), a gear 421 rotatably supported by the box-shaped housing 110 and meshed with a worm gear securely formed with the deriving shaft of the third driving motor 410, a gear 422 rotatably supported by the box-shaped housing 110 and meshed with the gear 421, a gear 423 rotatably supported by the box-shaped housing 110 and meshed with the, gear 422, a gear 424 rotatably supported by the box-shaped housing 110 and meshed with the gear 423, a gear 425 rotatably supported (4 by the box-shaped housing 110 and meshed with the gear 424, and an arcuate-shaped slide plate 430 having a toothed peripheral portion 430c meshed with the gear 425. The arcuate-shaped slide plate 430 has formed therein two arcuate-shaped slots 430a and 430b each slidably receiving a guide pin. The third driving motor 410 is operative to produce and transmit a rotation torque to the arcuate-shaped slide plate 430 through the gears 421 to 425, and to have the arcuate-shaped slide plate 430 swingably move with respect to the box-shaped housing 110. The arcuate-shaped slide plate 430 functions as a transmission gear.

The optical disk driving unit 101 further includes a gear 442 (see FIG. 15) rotatably supported by the box-shaped housing 110 and meshed with the toothed peripheral portion 430c of the arcuate-shaped slide plate 430, a lever 444 (see FIG. 15) pivotably supported by a plate (not shown) which is in parallel relationship with the bottom plate 116 forming part of the box-shaped housing 110. The gear 442 has formed therein a cam groove 442a slidably receiving the shaft 444b.

Figure 17:
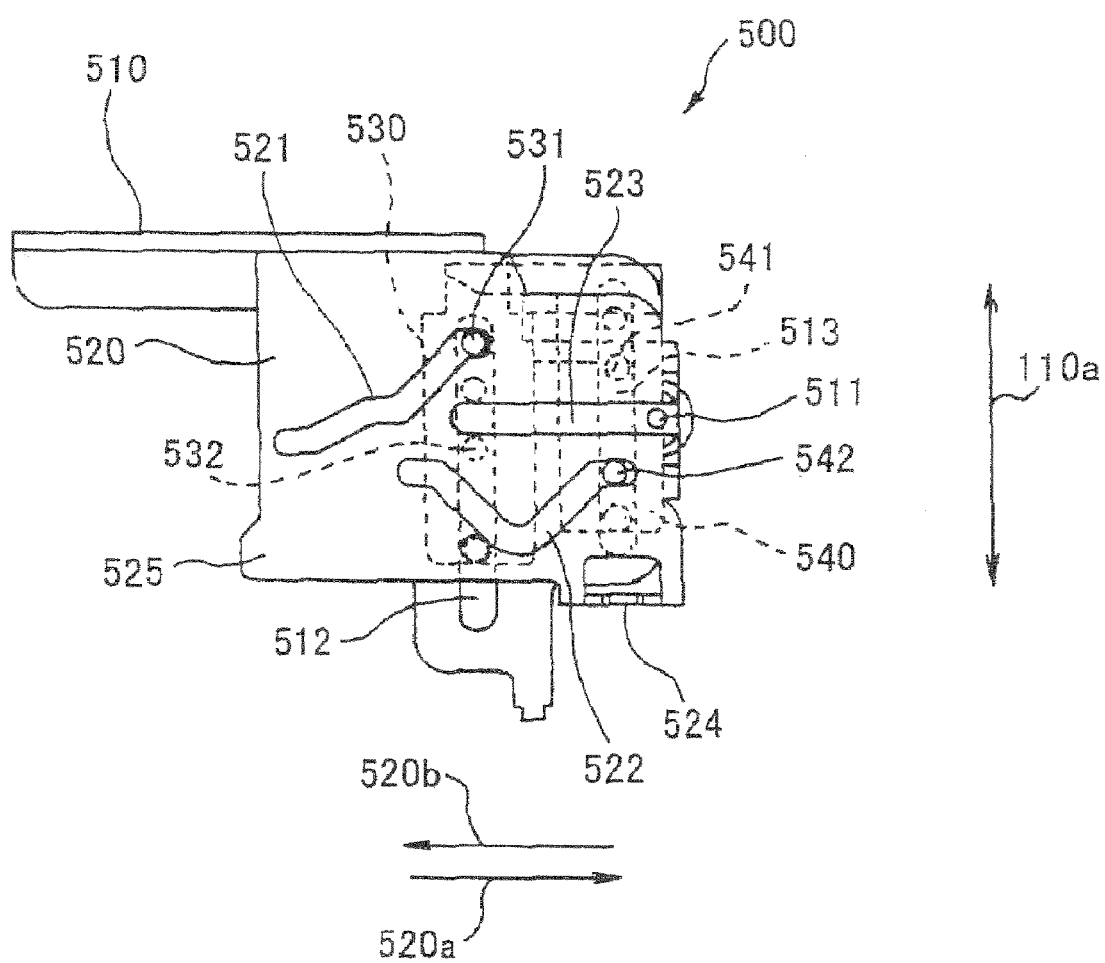
FIG. 17 is a side view of a first optical disk guiding mechanism of the optical disk driving unit of the optical disk driving apparatus according to the preferred embodiment of the present invention.

The optical disk driving unit 101, as shown in FIGS. 17 to 18, further includes a first optical disk guiding mechanism 500 including a base plate 510 having formed therein first and second slots 512 and 513 each extending in the direction indicated by the arrow 110a shown in FIG. 15, and a cam plate 520 having formed therein first and second loading slots 523 and 524 each extending in the direction indicated by arrows 520a and 520b shown in FIG. 15, having formed therein first and second cam slots 521 and 522.

The first optical disk guiding mechanism 500 further includes a first shaft 531 slidably received by each of the first slot 512 of the base plate 510 and the first cam groove 521 of the cam plate 520, a second shaft 532 slidably received by the first slot 512 of the base plate 510, a second retaining member 530 slidably retained by the base plate 510 in the direction indicated by the arrow 110a shown in FIG. 17.

The first optical disk guiding mechanism 500 further includes a first shaft 541 slidably received by the second slot 513 of the base plate 510, a second shaft 542 slidably received by each of the second slot 513 of the base plate 510 and the second cam groove 522 of the cam plate 520, a second retaining member 540 slidably retained by the base plate 510 in the direction indicated by the arrow 110a shown in FIG. 17.

The optical disk driving unit 101, as shown in FIGS. 15 to 16, further includes a gear 452 rotatably supported by a base plate (not shown) which is in parallel relationship with the bottom plate 116, and meshed with the toothed peripheral portion 430c of the arcuate-shaped slide plate 430, and a lever 454 pivotably supported by a base plate (not shown) which is in parallel relationship with the bottom plate 116, and integrally formed with each of a shaft 454a slidably received by the cam groove 452a of the gear 452, and a shaft 454b held in engagement with the base plate 310. The gear 452 functions as a first cam gear.

The optical disk driving unit 101 further includes a wire spring 455 for urging the base plate 310 through the lever 454 in the direction indicated by the arrow 310a shown in FIG. 1 under the state that the base plate 310 assumes a first position (see FIG. 16), and urging the base plate 310 through the lever 454 in the opposite direction of the arrow 310a shown in FIG. 1 under the state that the base plate 310 assumes a second position (see FIG. 16). The wire spring 455 is in the form of U-shape. The optical disk driving unit 101 further includes an arm member 457 slidably supported by shafts 458a and 458b each integrally formed with a plate (not shown) which is in parallel relationship with the bottom plate 116. The arm member 457 has a shaft 457a to be received by the cam groove 452b of the gear 452, a groove 457b receiving the shaft 381 (see FIG. 13) of the lever 380 (see FIG. 13), a groove 457c receiving the shaft 458a of the plate (not shown), and a groove 457d receiving the shaft 458b of the plate (not shown).

Here, the lever 454 and the wire spring 455 collectively constitute a base plate driving mechanism 103 for driving the base plate 310 to have the base plate 310 pivotably move with respect to the box-shaped housing 110. The slide plate 370 (see FIG. 13), the lever 380 (see FIG. 13), the lever 390 (see FIG. 13), and the arm member 457 collectively constitute a supporting member fixing mechanism 102 for releasing the supporting member 330 from being isolated from the outside vibrations by the vibration isolators 321, 322, and 323 (see FIG. 11).

The optical disk driving unit 101 further includes a gear 462 rotatably supported by a shaft 461 with respect to the bottom plate 116, and meshed with the toothed peripheral portion 430c of the arcuate-shaped slide plate 430, a lever 454 pivotably supported by a base plate (not shown) which is in parallel relationship with the bottom plate 116. The lever 454 is integrally formed with a shaft 454a slidably received by the cam groove 452a of the gear 452, and integrally formed with a shaft 454b held in engagement with the optical disk cramp mechanism (not shown). The gear 462 functions as a third cam gear.

The optical disk driving unit 101 further includes a gear 472 rotatably supported by the bottom plate 116 by means of a shaft 471, meshed with the gear 462, and having a cam groove 472a formed therein, and a lever 474 pivotably supported by the bottom plate 116 by means of the shaft 473, and integrally formed shafts 474a and 474b held in engagement with the cam groove 472a of the gear 472. The optical disk driving unit 101 further comprises a slide plate 475 slidably supported by the bottom plate 116 by means of shafts 116a and 116b each integrally formed with the bottom plate 116. The slide plate 475 has formed therein a slot 475a slidably receiving the shaft 474a forming part of the lever 474. The slide plate 475 has a toothed peripheral portion 475b meshed with the gear portion 242 forming part of the cam gear 240, a toothed peripheral portion 475c meshed with the gear portion 252 forming part of the cam gear 250, and a toothed peripheral portion 475d meshed with, a gear 550.

Figure 19:
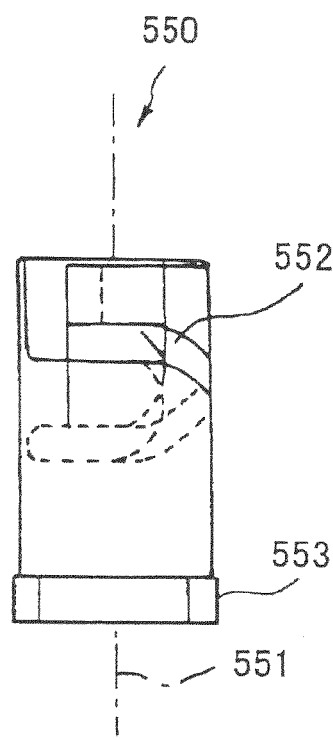
FIG. 19 is a side view of the gear to be received by a disk stopper of the preferred embodiment of the optical disk driving apparatus according to the present invention.
Figure 20:
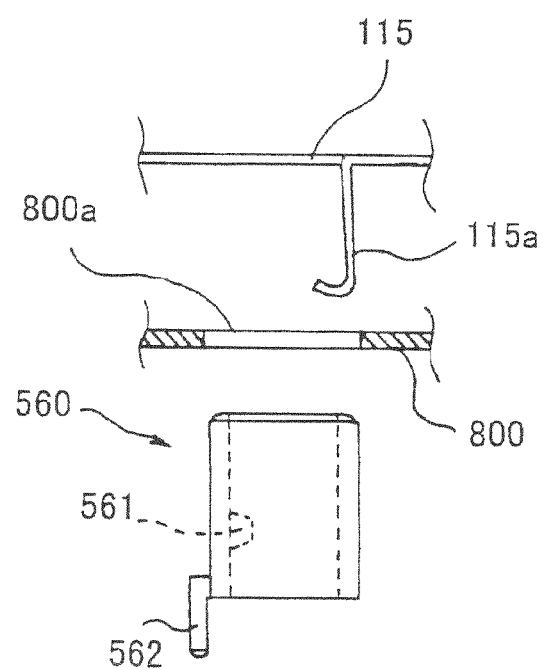
FIG. 20 is a side view of the preferred embodiment of the optical disk driving apparatus according to the present invention.

The lever 474, the slide plate 475, and the cam gears 240 and 250 collectively constitute an interval adjusting mechanism 106 for adjusting each of the intervals of the trays 131 to 136 (see FIG. 2). The optical disk driving unit 101, as shown in FIGS. 19 and 20, further comprises a gear 550 rotatably supported by the bottom plate 116 (see FIG. 16) by means of a shaft 551. The gear 550 has two different portions consisting of a gear portion 553 meshed with the toothed peripheral portion 475d (see FIG. 16) of the slide plate 475 (see FIG. 16), and a cam portion having a groove 552 formed therein.

The optical disk driving unit 101 further includes a first disk stopper 560 made in the form of a hollow shape, and a second disk stopper 115a integrally formed with the top plate 115 of the box-shaped housing 110. The first disk stopper 560 has a projected portion 561 to be slidably received by the groove 552 of the gear 550, and a projected portion 562 to be received by a bore (not shown) of the bottom plate 116. The optical disk driving unit 101, as shown in FIGS. 15 and 16, further includes a cam member 481 rotatably supported by the box-shaped housing 110 by means of a shaft 471, and a lever 473 pivotably supported by a plate (not shown) which is in parallel relationship with the top plate 115 forming part of the box-shaped housing 110. The lever 473 has a shaft 483 a and a shaft 483b held in engagement with the cam groove 481 a of the cam member 481.

The gear 472 and the cam member 481 collectively constitute a second cam gear. The gear 472 may be integrally formed with the cam member 481. The optical disk driving unit 101, as shown in FIG. 21, further includes a second optical disk guiding mechanism 600 including a base plate 610 integrally formed with the bottom plate 116 (see. FIG. 3), and a cam plate 620 swingably supported by the base plate 610. The cam plate 620 has formed therein a second slot 624 receiving the shaft 483a (see. FIG. 15) of the lever 473 (see. FIG. 15). The base plate 610 is similar in shape to the base plate 510 (see. FIG. 18) forming part of the first optical disk guiding mechanism 500 (see. FIG. 18). The cam plate 620 is similar in shape to the cam plate 520 (see. FIG. 18) forming part of the first optical disk guiding mechanism 500 (see. FIG. 18).

The optical disk driving unit 101 further includes the second optical disk guiding mechanism 600 including a first retaining member 630 supported by the base plate 610 and slidably moved in the direction indicated by arrows 110a (shown in FIGS. 21a to 21d), and a second retaining member 640 supported by the base plate 610 and slidably moved in the direction indicated by arrows 110a (shown in FIGS. 21a to 21d). The first retaining member 630 is similar in shape to the first retaining member 530 (see. FIG. 18) forming part of the first optical disk guiding mechanism 500 (see. FIG. 18). The second retaining member 640 is similar in shape to the second retaining member 540 (see. FIG. 18) forming part of the first optical disk guiding mechanism 500 (see. FIG. 18).

Figure 22:
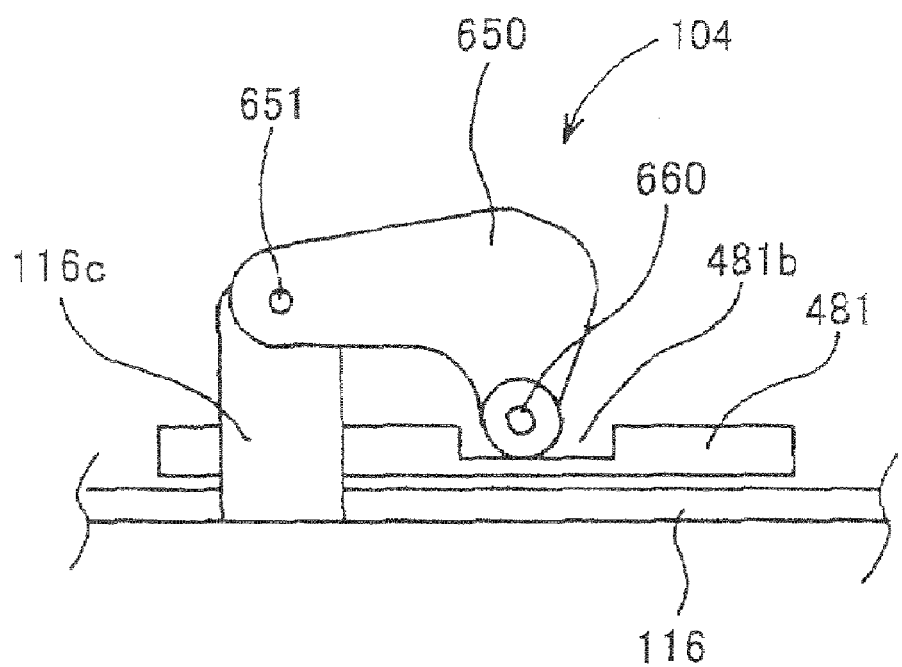
FIG. 22 is a fragmentally enlarged side view of a shutter plate driving mechanism of the optical disk driving apparatus according to a preferred embodiment of the present invention.

The lever 483 (see FIG. 15) and the second optical disk guiding mechanism 600 collectively constitute an optical disk guiding mechanism 105 for guiding each of the optical disks 800 to the turntable 350 (see FIG. 11) from the trays 130 (see FIG. 2) and vice versa. The bottom plate 116 has a projected portion 116c. The optical disk driving unit 101, as shown in FIG. 22, further includes a lever 650 pivotably supported by the projected portion of the bottom plate 116. and a roller 660 pivotably supported by the lever 650.

Here, the lever 650 and the roller 660 collectively constitute a shutter plate driving mechanism 104 for driving a shutter plate (not shown) to shut and open the loading slot of the front plate 111.

The optical disk driving unit 101, as shown in FIG. 16, further includes a plurality of switches 670, 680, 690, and 700 each held in engagement with the arcuate-shaped slide plate 430, an optical sensor (not shown) for detecting the optical disk 800 inserted by the operator through the loading slot of the front plate 111. The optical disk driving unit 101 further includes an operation unit (not shown) for producing command signals, a control unit (not shown) for controlling each of the first driving motor 260 (see FIG. 10), the second driving motor 360 (see FIG. 12), the third driving motor 410, and a driving motor (not shown) for driving a loading roller 120 (see FIG. 2) based on each of results detected by the optical sensor (not shown) and the switches 670, 680, 690, and 700 in response to the command signals produced by the operation unit.

Figure 23:
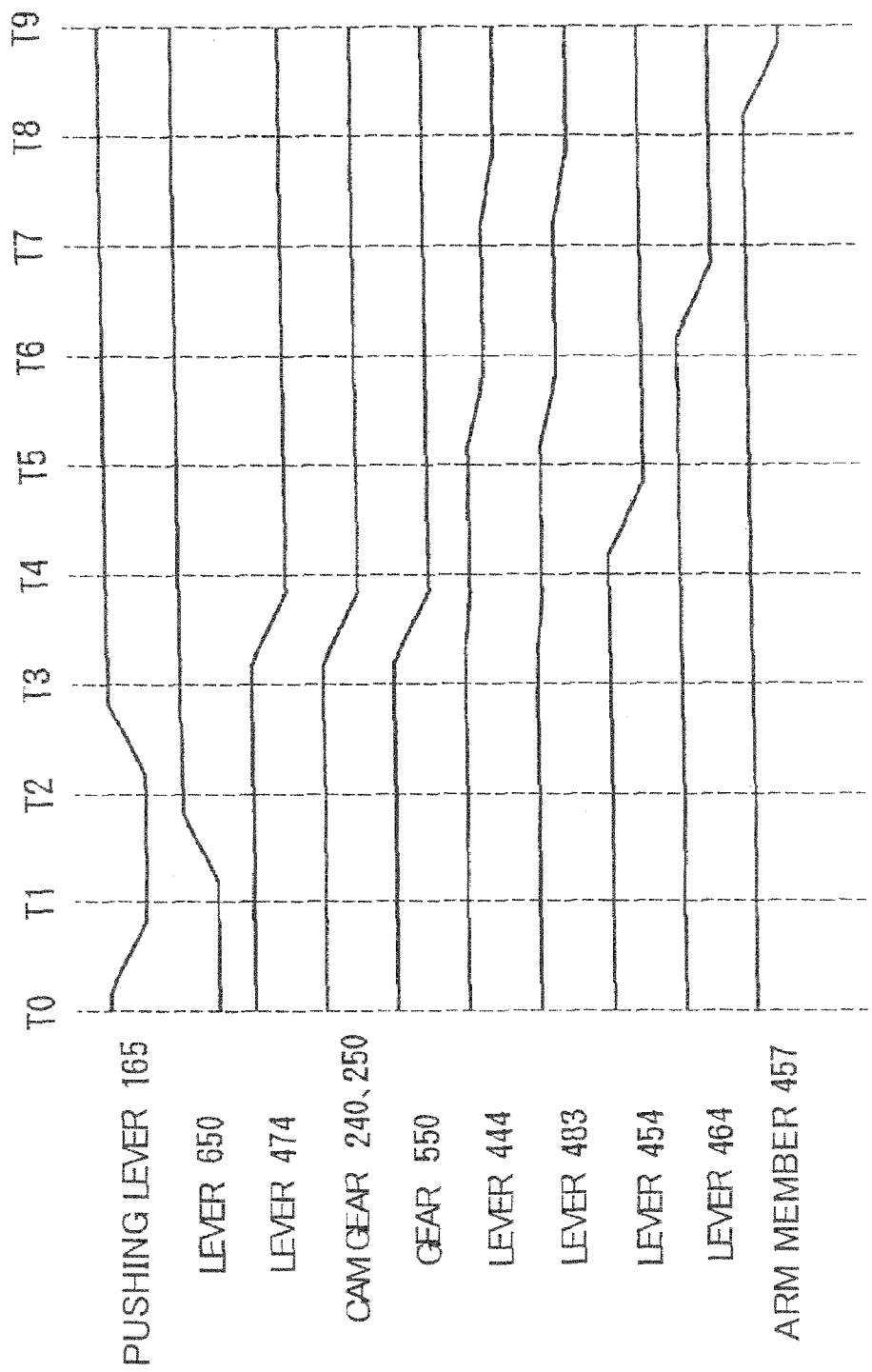
FIG. 23 is a timing chart showing an operation of the arcuate-shaped slide plate 430 the preferred embodiment of the optical disk driving apparatus according to the present invention.
Figure 24:
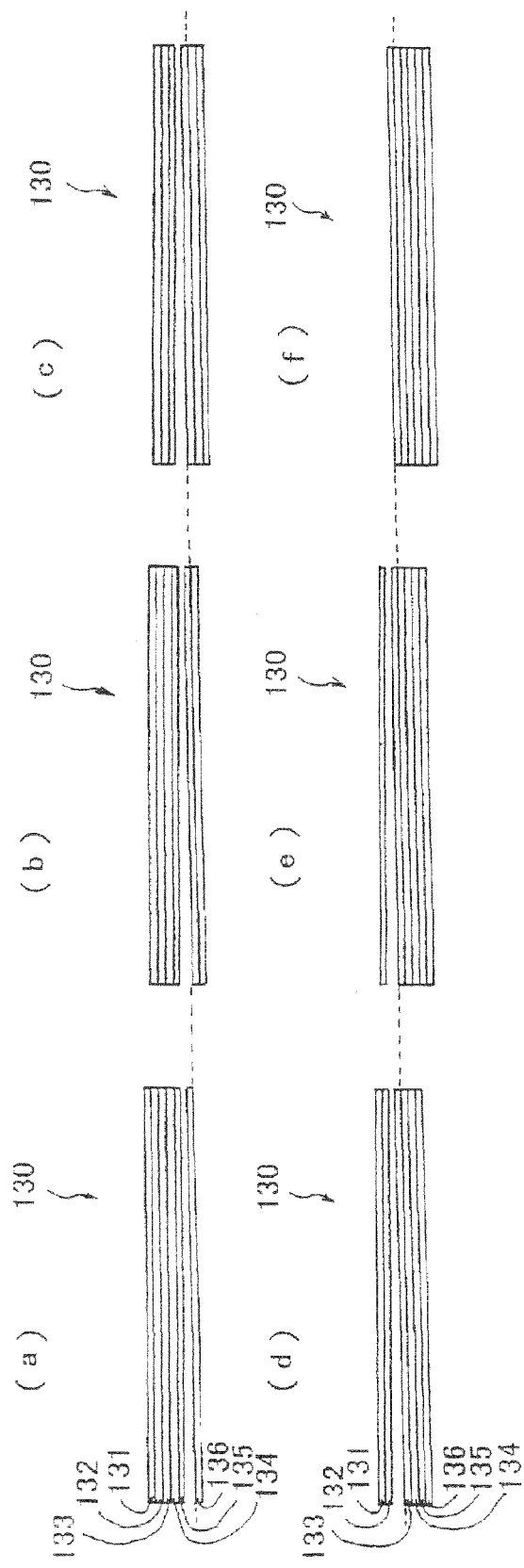
FIGS. 24(a) to (f) are a side view of the trays of the optical disk driving apparatus according to a preferred embodiment of the present invention.
Figure 25:
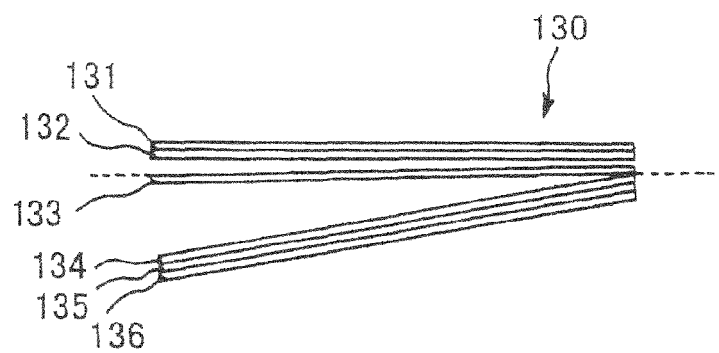
FIG. 25 is a side view of the trays of the optical disk driving apparatus according to a preferred embodiment of the present invention.
Figure 26:
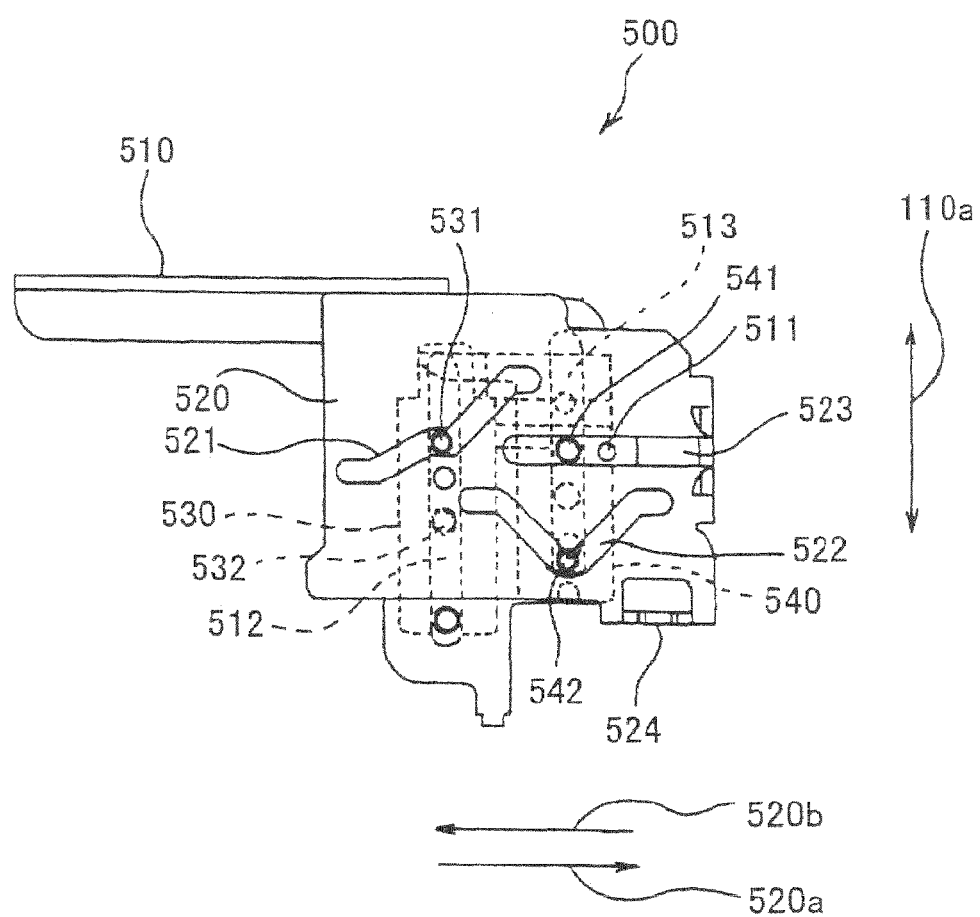
FIG. 26 is a side view of the first optical disk guiding mechanism shown in FIG. 18(c)
Figure 27:
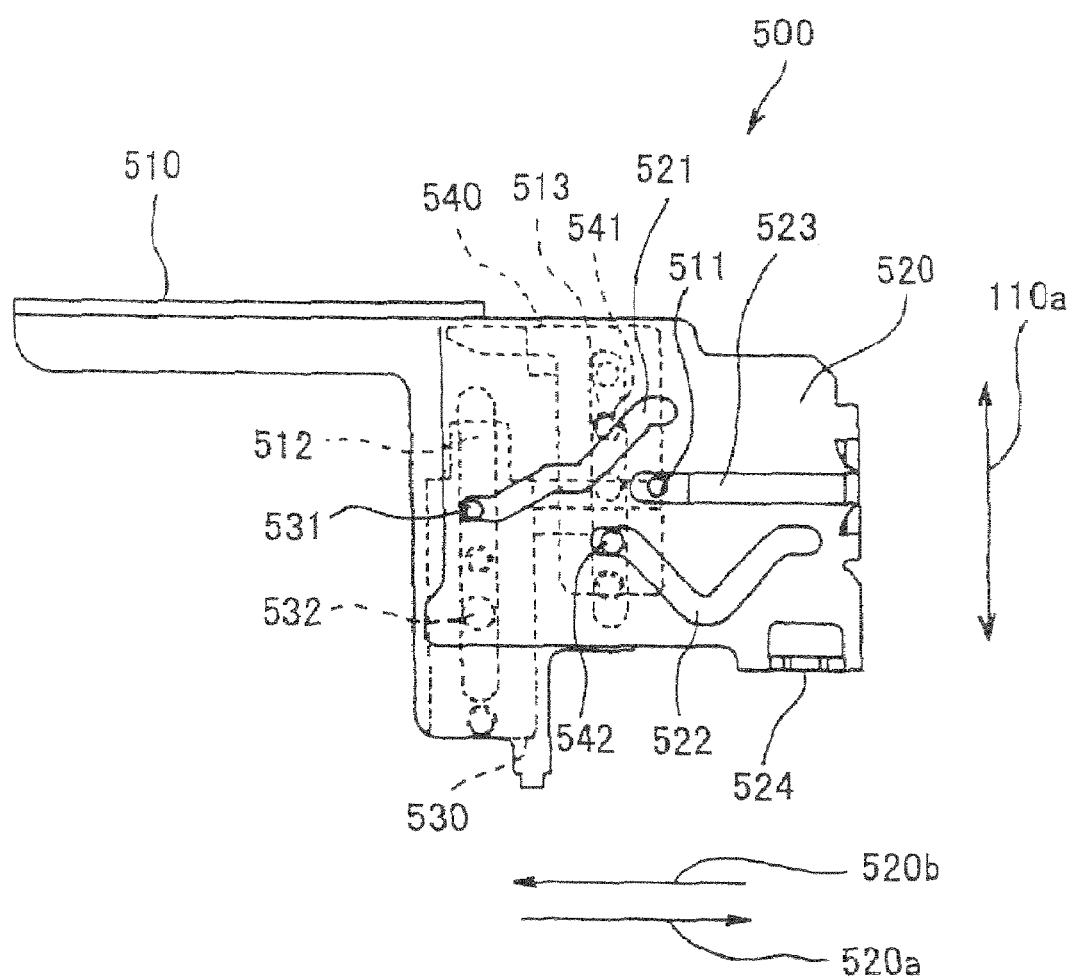
FIG. 27 is a side view of the first optical disk guiding mechanism shown in FIG. 18(d)

As shown in FIG. 23, the arcuate-shaped slide plate 430 is operative to assume nine different operation states including a first operation state to transmit the rotation torque produced by the first driving motor 260 to the push lever 165, a second operation state to transmit the rotation torque produced by the first driving motor 260 to the lever 650, a third operation state to transmit the rotation torque produced by the first driving motor 260 to the push lever 165, a fourth operation state to transmit the rotation torque produced by the first driving motor 260 to each of the cam gear 240, the cam gear 250, the gear 550, the lever 444, and the lever 483, a fifth operation state to transmit the rotation torque produced by the first driving motor 260 to the lever 454, a sixth operation state to transmit the rotation torque produced by the first driving motor 260 to the lever 444 and the lever 483, a seventh operation state to transmit the rotation torque produced by the first driving motor 260 to the lever 464, a eighth operation state to transmit the rotation torque produced by the first driving motor 260 to the lever 444 and the lever 483, a ninth operation state to transmit the rotation torque produced by the first driving motor 260 to the arm member 457.

The operation of the preferred embodiment of the optical disk driving apparatus 100 according to the present invention will be then described hereinafter with reference to FIGS. 23 to 27 of the drawings.

The third operational position "T2" is firstly assumed by the arcuate-shaped slide plate 430. The loading slot of the front plate 111 forming part of the box-shaped housing 110 is shut by the shutter plate (not shown) under the state that the third operational position "T2" is assumed by the arcuate-shaped slide plate 430. Each of the trays 131 to 136 is standing by at initial tray positions under the state that the third operational position "T2" is assumed by the arcuate-shaped slide plate 430.

The operation unit (not shown) is operated by the operator to produce a command signal to have any one of the trays 131 to 136 receive the optical disk inserted by the operator through the loading slot of the front plate 111 forming part of the box-shaped housing 110, while the first driving motor 260 is controlled by the control unit (not shown) to produce the rotation torque in response to the command signal produced by the operation unit (not shown).

The rotation torque produced by the first driving motor 260 is then transmitted to the cam gear 210 through the worm gear 261 and the gears 271 to 273, transmitted to the cam gear 220 through the worm gear 261 and the gears 271, 272, 274, and 275, and transmitted to the cam gear 230 through the worm gear 261 and the gears 276 to 278.

The cam gears 210, 220, and 230 are respectively moved around the central axes of the shafts 213, 223, and 233 in synchronization with one another, and in response to the rotation torque produced by the first driving motor 260, while each of the intervals of the trays 131 to 136 is, as shown in FIGS. 24(a) to 24(f), partially and sequentially enlarged by the spiral-shaped cam portions 211, 221, and 231 forming part of the cam gears 210, 220, and 230 in order shown in FIGS. 24(a) to 24(f) as each of the trays 131 to 136 are moved in the direction of toward the bottom plate 116 forming part of the box-shaped housing 110.

The interval partially enlarged by the spiral-shaped cam portions 221 and 231 forming part of the cam gears 220 and 230 exceeds the interval partially enlarged by the spiral-shaped cam portion 211 forming part of the cam gear 210 by reason that the inclination of each of the spiral-shaped cam portions 221 and 231 exceeds the inclination of the spiral-shaped cam portion 211. When the tray accommodating the optical disk requested by the operator is moved into the load and release position by the cam gears 210, 220, and 230, the first driving motor 260 is controlled by the control unit (not shown) to stop producing the rotation torque, on the other hand, the third driving motor 410 is controlled by the control unit (not shown) to start to produce the rotation torque.

When the third driving motor 410 is controlled by the control unit (not shown) to start to produce and transmit a rotation torque to the arcuate-shaped slide plate 430 through the gears 421 to 425, the arcuate-shaped slide plate 430 is slidably moved in the direction indicated by the arrow 432 (shown in FIG. 1) in response to the rotation torque produced by the third driving motor 410.

When the arcuate-shaped slide plate 430 is operated to move in the direction indicated by the arrows 431 and 432 shown in FIG. 1, the gear 462 meshed with the toothed peripheral portion 430c of the arcuate-shaped slide plate 430 is moved around the central axis of the shaft 462 in response to the rotation torque transmitted by the arcuate-shaped slide plate 430, and each of the gear 472 meshed with the gear 462 and the cam member 481 securely fitted into the gear 472 is rotatably moved around the central axis of the shaft 471 in response to the rotation torque transmitted by the gear 462.

When the arcuate-shaped slide plate 430 is then moved in the direction indicated by the arrow 431 shown in FIG. 1 through the third operational position "T2" in response to the rotation torque produced by the third driving motor 410, the roller 660 is received by the cam groove 481b of the cam member 481. At the same time, the loading slot of the front plate 111 forming part of the box-shaped housing 110 is opened by the lever 650.

The judgment is then made by the control unit (not shown) on whether or not the arcuate-shaped slide plate 430 is detected by each of the switches 670, 680, and 690. When the arcuate-shaped slide plate 430 is not detected by each of the switches 670 and 680, the judgment is made as the arcuate-shaped slide plate 430 is moved into the second operation position "T1".

The third driving motor 410 is controlled by the control unit (not shown) to stop producing the rotation torque based on results judged by the control unit (not shown).

When the optical disk is inserted into the loading slot of the front plate 111 forming part of the box-shaped housing 110 by the operator, the optical disk is detected by the optical sensor (not shown). The loading roller 120 is then controlled by the control unit (not shown) in response to results detected by the optical sensor (not shown). The optical disk inserted by the operator is then moved by the loading roller 120 in the direction of toward the rear plate 112 forming part of the box-shaped housing 110.

When the optical disk inserted by the operator is moved by the loading roller 120 in the direction of toward the rear plate 112 forming part of the box-shaped housing 110, the optical disk inserted by the operator is guided by the adjusting lever 160 (see FIG. 2), and loaded by the trays 131 to 136. The disk stoppers 560 and 115a are then controlled by the control unit (not shown) to regulate the optical disks 800 respectively loaded by the trays 131 to 136.

When the optical disk 800 inserted by the operator is loaded onto any one of the trays 131 to 136, the driving motor (not shown) is controlled by the control unit (not shown) to stop producing the rotation torque before the third driving motor 410 is controlled by the control unit (not shown) to start to produce the rotation torque.

When the arcuate-shaped slide plate 430 is not detected by the switch 690, the third driving motor 410 is controlled by the control unit (not shown) to stop producing the rotation torque before the first driving motor 260 is controlled by the control unit (not shown) to start to produce the rotation torque. The trays 131 to 136 is then moved into the load and release position in response to the rotation torque produced by the first driving motor 260:

When the operation unit (not shown) is operated by the operator to produce a command signal to eject the optical disk requested by the operator from the trays 131 to 136, first driving motor 260 is controlled by the control unit (not shown) to have the tray selected by the operator from among the trays 131 to 136 move to the load and release position.

When the first driving motor 260 is controlled by the control unit (not shown) to have the tray selected by the operator from among the trays 131 to 136 move into the load and release position, the first driving motor 260 is controlled by the control unit (not shown) to stop producing the rotation torque before the third driving motor 410 is controlled by the control unit (not shown) to start to produce the rotation torque.

While the arcuate-shaped slide plate 430 is slidably moved to the second operational position "T1" from the third operational position "T2" in response to the rotation torque produced by the third driving motor 410, the loading slot of the front plate 111 forming part of the box-shaped housing 110 is opened by the lever 650. When the arcuate-shaped slide plate 430 is slidably moved in the direction indicated by the arrow 432 (shown in FIG. 1) through the second operational position "T1" in response to the rotation torque produced by the third driving motor 410, the driving mechanism (not shown) is driven by the third driving motor 410 to have the push lever 165 move around the central axis of the shaft 166, and release the optical disk selected by the operator from the trays 131 to 136.

When the arcuate-shaped slide plate 430 is detected by each of the switches 670, 680, and 690, the judgment is made by the control unit (not shown) as the arcuate-shaped slide plate 430 takes the first operational position "TO" in response to the rotation torque produced by the third driving motor 410. The third driving motor 410 is then controlled by the control unit (not shown) to stop producing the rotation torque. The optical disk 800 is then ejected by the push lever 165 from one of the trays 131 to 136, and moved by the loading roller 120 toward the front plate 111 forming part of the box-shaped housing 110.

When the optical disk 800 conveyed by the loading roller 120 takes a position just before the loading slot of the front plate 111 forming part of the box-shaped housing 110, the optical disk 800 is detected by the optical sensor (not shown). When the optical disk 800 is then ejected from the box-shaped housing 110 by the, operator, the optical disk 800 is not detected by the optical sensor (not shown). The third driving motor 410 is then controlled by the control unit (not shown) to produce the rotation torque, while the arcuate-shaped slide plate 430 is moved to the position "T2" in response to the rotation torque produced by the third driving motor 410. The loading slot of the front plate 111 forming part of the box-shaped housing 110 is then closed by the control unit (not shown) after the push lever 165 is moved back toward the initial position.

When the arcuate-shaped slide plate 430 takes the position "T2", each of the tray 131 to 136 is moved to the initial position by controlling the first driving motor 260 to have the first driving motor 260 produce the rotation torque.

When the command signal to reproduce music or image recorded by one of the optical disks 800 selected by the operator from among the optical disks 800 accommodated by the trays 131 to 136 is produced by the operation unit (not shown), the first driving motor 260 is controlled by the control unit (not shown) to have one of the trays 131 to 136 which accommodates one of the optical disks 800 selected by the operator move to the release position.

When, for example, the command signal to reproduce music or image recorded by the optical disk 800 accommodated by the tray 133 is produced by the operation unit (not shown), the first driving motor 260 is controlled by the control unit (not shown) to have the tray 133 move to the release position.

After the first driving motor 260 is then controlled by the control unit (not shown) to have the tray 133 move to the release position, the first driving motor 260 is controlled by the control unit (not shown) to stop producing the rotation torque, and the third driving motor 410 is controlled by the control unit (not shown) to produce the rotation torque.

When the third driving motor 410 is then controlled by the control unit (not shown) to produce the rotation torque, the arcuate-shaped slide plate 430 is moved in the direction indicated by the arrow 431 shown in FIG. 1 in response to the rotation torque produced by the third driving motor 410. The third driving motor 410 is then controlled by the control unit (not shown) to have the push lever 165 eject one of the optical disks 800 requested by the operator from one of the trays 131 to 136, and to have each of the optical disk guiding mechanism 500 which assumes an operation state shown in FIG. 18(a) and the optical disk guiding mechanism 600 which assumes an operation state shown in FIG. 21(a) receive one of the optical disks 800 ejected by the push lever 165.

When the arcuate-shaped slide plate 430 is moved in the direction indicated by the arrow 431 shown in FIG. 1 in response to the rotation torque produced by the third driving motor 410, the lever 474 is moved around the pivotal axis of the shaft 473 in response to the rotation torque transmitted by the arcuate-shaped slide plate 430 through the gear 472. When the lever 474 is moved around the pivotal axis of the shaft 473, the slide plate 475 is moved as the slide plate 475 is slidably supported by with the shafts 116a and 116b of the bottom plate 116.

When the slide plate 475 is then moved as the slide plate 475 is slidably supported by with the shafts 116a and 116b of the bottom plate 116, the cam gear 240 is moved round the central axis of the shaft 243, the cam gear 250 is moved round the central axis of the shaft 253, and the gear 550 is moved around the central axis of the shaft 551.

When the cam gears 240 and 250 are respectively moved around the rotation axes of the shafts 243 and 253, the trays 131 to 136 are sequentially moved toward the bottom plate 116 forming part of the box-shaped housing 110 by the cam portions 241 and 251 forming part of the cam gears 240 and 250 (see FIG. 9).

Consequently, the intervals of the trays 131 to 136 are sequentially enlarged by the cam portions 241 and 251 forming part of the cam gears 240 and 250.

When, for example, the command signal to reproduce music or images from the data stored in the optical disk 800 accommodated by the tray 134 is produced by the operation unit (not shown), the interval between the tray 133 and the tray 134 is adjusted and enlarged by the cam gears 240 and 250.

When the arcuate-shaped slide plate 430 is moved through the fifth operational position "T4" in the direction indicated by the arrow 431 shown in FIG. 1 in response to the rotation torque produced by the third driving motor 410, the gear meshed with the toothed peripheral portion 430c of the arcuate-shaped slide plate 430 is moved around the central axis of the shaft 451. The lever 454 having the shaft 454a to be slidably received by the cam groove 452a of the gear 452 is then rotatably moved around the central axis of the shaft 453. The base plate 310 held in engagement of the shaft 454b of the lever 454 is then moved around the central axis of the shaft 311, and against an urge force of the wire spring 455 to a position shown in FIG. 4 from a position shown in FIG. 2.

When the arcuate-shaped slide plate 430 is moved from the position "T5" in the direction indicated by the arrow 431 shown in FIG. 1 in response to the rotation torque produced by the third driving motor 410, the gear 442 meshed with the toothed peripheral portion 430c of the arcuate-shaped slide plate 430 is moved around the central axis of the shaft. 471 in response to the rotation torque transmitted by the arcuate-shaped slide plate 430 through the gear 472, the lever 444 is moved around the central axis of the shaft 443, the lever 483 having the shaft 483b held in engagement with cam member 481 is moved around the pivotal axis of the shaft 483b. When the lever 144 is then moved around the central axis of the shaft 443, the cam plate 520 forming part of the first optical disk guiding mechanism 500 is moved in the direction indicated by the arrow 520a shown in FIG. 15.

When the cam plate 520 forming part of the first optical disk guiding mechanism 500 is moved in the direction indicated by the arrow 520*a* shown in FIG. 15, the first and second retaining members 530 and 540 each slidably supported by the cam plate 510 are respectively moved from positions shown in FIG. 18(*a*) to positions shown in FIG. 18(*b*). When the optical disk 800 is securely retained by the first and second retaining members 530 and 540, and moved to a position to be engaged with the turn table 350, the first and second retaining members 530 and 540 are respectively moved from positions shown in FIG. 18(*b*) to positions shown in FIG. 18(*c*).

When the arcuate-shaped slide plate 430 is moved through the seventh operational position "T6" in the direction indicated by the arrow 431 shown in FIG. 1 in response to the rotation torque produced by the third driving motor 410, the lever 464 having the shaft 464*a* held in engagement with the cam groove 462*a* of the gear 462 is moved around the central axis of the shaft 463. The cramp members 351, 352, and 353 (see FIG. 10) forming part of the optical pickup unit 300 (see FIG. 10) are then driven by the optical disk cramp mechanism (not shown) held in engagement with the shaft 464*b* forming part of the lever 464.

When the optical disk requested by the operator is not mounted on the turntable 350, the cramp members 351, 352, and 353 (see FIG. 10) forming part of the optical pickup unit 300 (see FIG. 10) are accommodated in the turntable 350. When, on the other hand, the optical disk requested by the operator is mounted on the turntable 350, the optical disk requested by the operator is securely cramped with respect to the turntable 350 by the cramp members 351, 352, and 353 (see FIG. 10) forming part of the optical pickup unit 300 (see FIG. 10).

When the arcuate-shaped slide plate 430 is moved through the eighth operational position "T7" in the direction indicated by the arrow 431 shown in FIG. 1 in response to the rotation torque produced by the third driving motor 410, the cam plate 520 forming part of the first optical disk guiding mechanism 500 is moved in the direction indicated by the arrow 520*a* shown in FIG. 15 with respect to the base plate 610. At the same time, the cam plate 620 forming part of the second optical disk guiding mechanism 600 is moved in the direction indicated by the arrow 620*a* shown in FIG. 15 with respect to the base plate 610. The first retaining member 530 supported by the base plate 510 is moved toward the bottom plate 116, while the second retaining member 540 supported by the cam plate 520 is moved toward the top plate 115.

When the arcuate-shaped slide plate 430 is moved through the ninth operational position "T8" in the direction indicated by the arrow 431 shown in FIG. 1 in response to the rotation torque produced by the third driving motor 410, the rotation torque is transmitted to the gear 452 by the arcuate-shaped slide plate 430. The gear 452 is then moved around the central axis of the shaft 451 in response to the rotation torque transmitted by the arcuate-shaped slide plate 430. The arm 457 having the shaft 457*a* slidably received by the can groove 452*b* of the gear 452 is then slidably moved in the direction indicated by the arrow 457*e* shown in FIG. 15 with respect to the base plate 610.

When the arm 457 is moved in the direction indicated by the arrow 457*e* shown in FIG. 1, the lever 380 (see FIG. 13) having the shaft 381 slidably received by the groove 457*b* of the arm 457 is moved around the central axis of the shaft 312 integrally formed with the base plate 310 in the direction indicated by the arrow 380*a* shown in FIG. 13. The slide plate 370 (see FIG. 13) having formed therein the groove 372 slidably receiving the shaft 382 of the lever 380 is slidably moved in the direction indicated by the arrow 370*a* shown in FIG. 13 with respect to the base plate 310.

When the slide plate 370 is moved in the direction indicated by the arrow 370*a* shown in FIG. 13 with respect to the base plate 310 under the state that the slide plate 370 is in parallel relationship with the base plate 310, the groove 371 of the slide plate 370 is moved to release from engagement with the groove of the supporting member 330.

When the slide plate 370 is further moved in the direction indicated by the arrow 370*a* shown in FIG. 13 with respect to the base plate 310, the lever 390 (see FIG. 13) having the shaft 392 slidably revived by the cam groove 373 of the slide plate 370 is moved around the central axis of the shaft 313 in the direction indicated by the arrow 390*a* shown in FIG. 13. The shaft 332 of the supporting member 330 is then released from the groove 391 of the lever 390.

From the above detail description, it will be understood that the supporting member 330 can be released from the outside vibrations when the data such as for example music and pictures stored by the optical disk mounted on the turntable 350 is reproduced by the optical disk driving apparatus by reason that the supporting member 330 is supported by the bass plate 310 through the vibration isolators 321, 322, and 323.

When the arcuate-shaped slide plate 430 is detected by the switch 700, the judgment is made by the control unit (not shown) as the arcuate-shaped slide plate 430 assumes the tenth operational position "T9". The third driving motor 410 is then controlled by the control unit (not shown) to stop producing the rotation torque before the driving motor 360 (see FIG. 14) is controlled by the control unit (not shown) to produce the rotation torque, and to have the optical disk mounted on the turntable 350 move around the central axis of the turntable 350.

From the above detail description, it will be understood that the optical disk mounted on the turntable 350 can be moved around the central axis of the turntable 350 in the interval between the disk stoppers 560 and 115*a* forming part of the top plate 115 by reason that the interval between the disk stopper 560 and 115*a* forming part of the top plate 115 under the tenth operational position "T9" is larger than the interval between the disk stoppers 560 and 115*a* forming part of the top Plate 115 I'I under the third operational position "T2".

From the above detail description, it will be understood that the optical disk mounted on the turntable 350 can be moved around the central axis of the turntable 350 in the interval between the first and second retaining members 530 and 540 each forming part of the first optical disk guiding mechanism 500 by reason that the first optical disk guiding mechanism 500 assumes an operation state shown in FIG. 18(*d*). The laser beam is then produced and emitted toward the optical disk mounted on the turntable 350 through the object lens 341 by the laser beam emitting device (not shown), while the laser beam reflected by the optical disk is received by the laser beam receiving device (not shown) through the object lens 341, and the digital signal indicative of the information such as for example music and pictures is reproduced from the laser beam reflected by the optical disk.

From the above detail description, it will be understood that the data such as for example music and pictures can be reproduced by the optical disk driving apparatus by reason that the digital signal is produced by the optical pickup unit 340 (see FIG. 11) forming part of the optical disk driving apparatus in response to the reflected laser beam in association with the information stored by the optical disk.

When the lever 444 is operated to pivotably move around the pivotal axis 443, the cam plate 520 slidably supported by the base plate 510 is moved in the direction indicated by arrows 520a shown in FIG. 15.

When the arcuate-shaped slide plate 430 is moved through the tenth operational position "T9" in the direction indicated by the arrow 432 shown in FIG. 1 in response to the rotation torque produced by the third driving motor 410, the lever 390 is moved around the central axis of the shaft 313 in the direction indicated by the arrow 390b. The groove 391 of the lever 390 is then engaged with the groove 332 of the supporting member 330 before the groove 371 of the slide plate 370 is engaged with the groove 331 of the supporting member 330.

From the above detail description, it will be understood that the central axis of the optical disk to be mounted on the turntable 350 can be aligned with the central axis of the turntable 350 under the state that the supporting member 330 is securely retained by the base plate 310 without being isolated from the outside vibrations by the vibration isolators 321, 322, and 323.

When the arcuate-shaped slide plate 430 is moved through the ninth operational position "T8" in the direction indicated by the arrow 432 shown in FIG. 1 in response to the rotation torque produced by the third driving motor 410, the first optical disk guiding mechanism 500 assumes an operation state shown in FIG. 18(c). At the same time, the second optical disk guiding mechanism 600 assumes an operation state shown in FIG. 21(c) in synchronization with the first optical disk guiding mechanism 500.

When the arcuate-shaped slide plate 430 is moved through the eighth operational position 77 in the direction indicated by the arrow 432 shown in FIG. 1 in response to the rotation torque produced by the third driving motor 410, the optical disk mounted on the turntable 350 is released from the cramp members 351 to 353 (see FIG. 11) of the optical pickup unit 300 (see FIG. 11). At the same time, the cramp members 351 to 353 (see FIG. 11) as accommodated in the turntable 350.

When the arcuate-shaped slide plate 430 is moved through the seventh operational position "T6" in the direction indicated by the arrow 432 shown in FIG. 1 in response to the rotation torque produced by the third driving motor 410, the first optical disk guiding mechanism 500 assumes an operation state shown in FIG. 18(a). At the same time, the second optical disk guiding mechanism 600 assumes an operation state shown in FIG. 21(a) in synchronization with the first optical disk guiding mechanism 500.

When the arcuate-shaped slide plate 430 is moved through the sixth operational position "T5" in the direction indicated by the arrow 432 shown in FIG. 1 in response to the rotation torque produced by the third driving motor 410, the optical pickup unit 300 is moved around the central axis of the shaft 311 as being urged by the wire spring 455, and assumes the second operational position shown in FIG. 4. When the arcuate-shaped slide plate 430 is moved through the fifth operational position "T4" in the direction indicated by the arrow 432 shown in FIG. 1 in response to the rotation torque produced by the third driving motor 410, the interval between the disk stoppers 560 and the disk stopper 115a forming part of the top plate 115 is decreased, and the trays is inclined by the cam gears 240 and 250.

When the arcuate-shaped slide plate 430 is moved through the fourth operational position "T3" in the direction indicated by the arrow 432 shown in FIG. 1, the push lever 165 is moved around the central axis of the shaft 166 by the driving mechanism (not shown) in response to the rotation torque produced by the third driving motor 410. The push lever 165 then assumes the initial operational position. When the arcuate-shaped slide plate 430 is then not detected by the switches 670 and 680, the judgment is made by the control unit (not shown) as the arcuate-shaped slide plate 430 assumes the third operational position "T2". The third driving motor 410 is then controlled by the control unit (not shown) to stop producing the rotation torque.

When the third driving motor 410 is controlled by the control unit (not shown) to stop producing the rotation torque, the loading roller 120 is moved around its central axis by a loading roller driving mechanism (not shown) in response to the rotation torque produced by the driving motor (not shown). At the same time, the optical disk is conveyed by the loading roller 120 to the load and release position, while any one of the trays 131 to 136 receives the optical disk conveyed by the loading roller 120.

When the judgment is made by the control unit (not shown) as the optical disk is received by any one of the trays 131 to 136, the driving motor (not shown) is controlled by the control unit (not shown) to stop producing the rotation torque. The first driving motor 260 is then controlled by the control unit (not shown) to produce the rotation torque, while each of the trays 131 to 136 assumes the tray initial position in response to the rotation torque produced by the first driving motor 260.

As will be seen from the foregoing description, the optical disk driving apparatus can ensure that the rotation torque produced by the first motor is timely transmitted to each of the shutter plate driving mechanism 104, optical disk guiding mechanism 105, base plate driving mechanism 103, and the supporting member fixing mechanism 102.

While the subject invention has been described with relation to the preferred embodiment, various modifications and adaptations thereof will now be apparent to those skilled in the art as far as such modifications and adaptations fall within the scope of the appended claims intended to be covered thereby.

What is claimed is:

1. An optical disk driving apparatus for selectively driving a plurality of optical disks, comprising: a housing including a front plate having a loading slot formed therein; and an optical disk driving unit accommodated in said housing, said optical disk driving unit including: a shutter plate for shutting and opening said loading slot of said front plate; a shutter plate driving mechanism for driving said shutter plate to shut and open said loading slot of said front plate; a turntable for selectively retaining said optical disks; a supporting member for rotatably supporting said turntable; a base plate pivotably retained by said housing; a plurality of vibration isolators for isolating said supporting member from outside vibrations by intervening between said supporting member and said base plate; a supporting member fixing mechanism for fixing said supporting member on said base plate by preventing said vibration isolators from isolating said supporting member from outside vibrations; a base plate driving mechanism for driving said base plate to pivotably move with respect to said housing; a plurality of trays for respectively accommodating said optical disks; an interval adjusting mechanism for adjusting each of said intervals of said trays; an optical disk guiding mechanism for guiding each of said optical disks to said turntable from said trays and vice versa; a first cam gear for transmitting a rotation torque to each of said supporting member fixing mechanism and said base plate driving mechanism; a second cam gear for transmitting said rotation torque to each of said shutter plate driving mechanism and said optical disk guiding mechanism; and a transmission gear for transmitting said rotation torque to each of said first cam gear and said second cam gear.

2. An optical disk driving apparatus as set forth in claim 1, in which said turntable includes a plurality of cramp members for cramping said optical disk mounted on said turntable under the state that said central axis of said turntable is axially aligned with said central axis of said optical disk mounted on said turntable, said optical disk driving unit further includes a third cam gear for transmitting a rotation torque to said cramp member, and said transmission gear is operative to transmit said rotation torque to said third cam gear.

3. An optical disk driving apparatus as set forth in claim 2, in which said base plate is pivotally moved with respect to said housing under the state that said central axis of said turntable is substantially in perpendicular relationship with said central axis of said optical disk inserted toward said trays through said loading slot of said front plate.

4. An optical disk driving apparatus for selectively driving a plurality of optical disks, comprising: a housing including a front plate having a loading slot formed therein; and an optical disk driving unit accommodated in said housing, said optical disk driving unit including: a shutter plate for shutting and opening said loading slot of said front plate; a shutter plate driving mechanism for driving said shutter plate to shut and open said loading slot of said front plate; a turntable for selectively retaining said optical disks; a supporting member for rotatably supporting said turntable; a base plate pivotably retained by said housing; a plurality of vibration isolators for isolating said supporting member from outside vibrations by intervening between said supporting member and said base plate; a supporting member fixing mechanism for fixing said supporting member on said base plate by preventing said vibration isolators from isolating said supporting member from outside vibrations; a base plate driving mechanism for driving said base plate to pivotably move with respect to said housing; a plurality of trays for respectively accommodating said optical disks; an optical disk guiding mechanism for guiding each of said optical disks to said turntable from said trays and vice versa; a first cam gear for transmitting a rotation torque to each of said supporting member fixing mechanism and said base plate driving mechanism; a second cam gear for transmitting said rotation torque to each of said shutter plate driving mechanism, said optical disk guiding mechanism, and said interval adjusting mechanism; and a transmission gear for transmitting said rotation torque to each of said first cam gear and said second cam gear.

5. An optical disk driving apparatus as set forth in claim 4, in which said turntable includes a plurality of cramp members for cramping said optical disk mounted on said turntable under the state that said central axis of said turntable is axially aligned with said central axis of said optical disk mounted on said turntable, said optical disk driving unit further includes a third cam gear for transmitting a rotation torque to said cramp member, and said transmission gear is operative to transmit said rotation torque to said third cam gear.

6. An optical disk driving apparatus as set forth in claim 5, in which said base plate is pivotally moved with respect to said housing under the state that said central axis of said turntable is substantially in perpendicular relationship with said central axis of said optical disk inserted toward said trays through said loading slot of said front plate.

* * * * *